United States Patent
Yoon

(10) Patent No.: US 9,841,830 B2
(45) Date of Patent: Dec. 12, 2017

(54) METHOD OF IDENTIFYING OBJECT AND ELECTRONIC DEVICE THEREFOR

(71) Applicant: Samsung Electronics Co., Ltd., Gyeonggi-do (KR)

(72) Inventor: Sung-Jin Yoon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 148 days.

(21) Appl. No.: 14/278,129

(22) Filed: May 15, 2014

(65) Prior Publication Data

US 2014/0354565 A1    Dec. 4, 2014

(30) Foreign Application Priority Data

May 28, 2013    (KR) .................. 10-2013-0060239

(51) Int. Cl.
*G06F 3/041*    (2006.01)
*G06F 3/03*    (2006.01)

(52) U.S. Cl.
CPC ............... *G06F 3/041* (2013.01); *G06F 3/03* (2013.01); *G06F 3/0416* (2013.01); *G06F 2203/04101* (2013.01); *G06F 2203/04108* (2013.01)

(58) Field of Classification Search
CPC . G06F 3/041; G06F 3/044; G06F 2203/04108
USPC .................................................. 345/173–174
See application file for complete search history.

(56) References Cited

U.S. PATENT DOCUMENTS

| 2003/0063073 | A1 | 4/2003 | Geaghan et al. |
| 2010/0045627 | A1* | 2/2010 | Kennedy ............... G06F 3/0416 345/173 |
| 2011/0227871 | A1* | 9/2011 | Cannon ................... A63F 13/02 345/174 |
| 2012/0235987 | A1 | 9/2012 | Lin et al. |
| 2012/0306813 | A1* | 12/2012 | Foerster ................ G06F 3/0488 345/174 |
| 2013/0314375 | A1* | 11/2013 | Rickstrom .............. G06F 3/044 345/174 |

FOREIGN PATENT DOCUMENTS

| JP | 2009116769 | 5/2009 |
| KR | 1020060000739 | 1/2006 |
| KR | 10-2010-0101779 | 9/2010 |
| KR | 1020120066245 | 6/2012 |

OTHER PUBLICATIONS

Rickstrom, Tero, "Method, System and Apparatus for Identifying an Object", May 31, 2012, U.S. Appl. No. 61/653,608, pp. 1-17.*

* cited by examiner

*Primary Examiner* — Kwin Xie
(74) *Attorney, Agent, or Firm* — The Farrell Law Firm, P.C.

(57) ABSTRACT

A method and an electronic device for identifying the object are provided. The method includes sensing an object which is located within a threshold distance from a touch screen, sensing at least four or more conductive substances which are contained in the object, and identifying the sensed object base on at least one of permittivity of each of the sensed conductive substances and a distance to each of the sensed conductive substances.

18 Claims, 38 Drawing Sheets

METHOD OF IDENTIFYING OBJECT AND ELECTRONIC DEVICE THEREFOR

PRIORITY

This application claims priority under 35 U.S.C. §119(a) to a Korean Patent Application filed in the Korean Intellectual Property Office on May 28, 2013 and assigned Serial No. 10-2013-0060239, the entire disclosure of which is incorporated herein by reference.

BACKGROUND OF THE INVENTION

1. Field of the Invention

Embodiments relate to an electronic device, and more particularly, to a method and an electronic device for identifying an object.

2. Description of the Related Art

Electronic devices such as smart phones and tablet Personal Computers (PCs) may perform wireless voice communication and exchange information. Meanwhile, the electronic devices featured as portable devices have been developed into multimedia devices to perform functions, such as a scheduling function, a game function, a remote control function, and a photographing function, to satisfy the user's needs.

Recently, electronic devices have been developed with each of them having a touch screen that may perform input and output simultaneously. Therefore, various user interfaces using the touch screen have been developed, such as hovering technology. The hovering technology is performed by sensing a subject that approaches the touch screen within a threshold distance of the touch screen and recognizing the corresponding approach as a touch, although the subject does not come in contact with the touch screen directly. When an electronic pen within the threshold distance of the touch screen of an electronic device is sensed, the electronic device with the hovering technology applied may recognize that a touch by the electronic pen is sensed although the electronic pen does not come in contact with the touch screen directly.

However, the above-described touch type is still a touch-based interface in which only a touch sensing distance is expanded compared to a direct touch. That is, the above-described interface using the hovering technology is not significantly different from an interface using a touch technology. Also, interfaces using the hovering technology have not been widely used.

SUMMARY OF THE INVENTION

The present invention has been made to address at least the above-mentioned problems and/or disadvantages and to provide at least the advantages described below.

Accordingly, an aspect of the present invention is to provide a method and an apparatus for sensing a proximity touch by an object in an electronic device.

Another aspect of the present invention is to provide a method and an apparatus for sensing and identifying an object using a hovering method in an electronic device.

Another aspect of the present invention is to provide a method and an apparatus for setting code values for identifying an object based on a distance between a touch screen and the object in an electronic device.

Another aspect of the present invention is to provide a method and an apparatus for setting code values for identifying an object according to permittivity of the object, which is sensed through a touch screen, in an electronic device.

Another aspect of the present invention is to provide a method and apparatus for restoring sensed code values according to a distance between a touch screen and an object and permittivity of the object and identifying the corresponding object.

In accordance with an aspect of the present invention, a control method of an electronic device is provided. The control method includes sensing an object which is located within a threshold distance from a touch screen, sensing at least four or more conductive substances which are contained in the object, and identifying the sensed object base on at least one of permittivity of each of the sensed conductive substances and a distance to each of the sensed conductive substances.

In accordance with another aspect of the present invention, an electronic device is provided. The electronic device includes one or more processors, a touch-sensitive display, a memory, and one or more programs, each program stored in the memory and configured to be executable by each of the one or more processors, wherein each program includes an instruction for sensing an object which is located within a threshold distance from a touch screen, sensing at least four or more conductive substances which are contained in the object, and identifying the sensed object base on at least one of permittivity of each of the sensed conductive substances and a distance to each of the sensed conductive substances.

DETAILED DESCRIPTION OF EMBODIMENTS OF THE PRESENT INVENTION

Various embodiments of the present invention will be described herein below with reference to the accompanying drawings. In the following description, well-known functions or constructions are not described in detail for clarity and conciseness.

Hereinafter, an electronic device may be any one of a mobile communication terminal, a tablet PC, a digital camera, a Moving Picture Experts Group (MPEG) layer 3 (MP3) player, a navigation device, a laptop, a netbook, a computer, a television, a refrigerator, an air conditioner, etc., each of which may recognize a touch including a multi-touch.

Figure 1A:
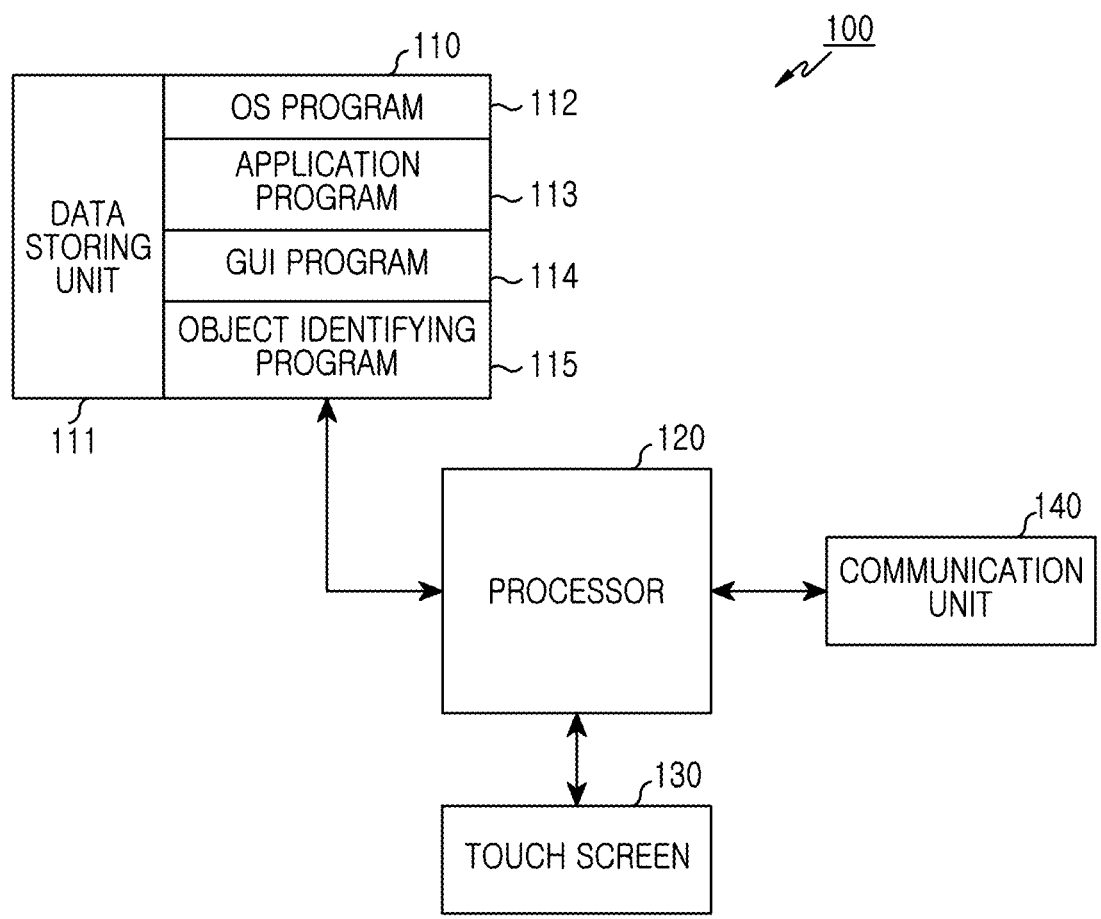
FIG. 1A is a block diagram illustrating a configuration of an electronic device for identifying an object according to an embodiment of the present invention.

FIG. 1A is a block diagram illustrating a configuration of an electronic device for identifying an object according to an embodiment of the present invention.

Hereinafter, for convenience of description, a description will be given under the assumption that an n×n square code set is generated when an object is sensed.

Referring to FIG. 1A, the electronic device 100 may include a memory 110, a processor 120, a touch screen 130, and a communication unit 140. The memory 110 and the processor 120 may be a plurality of memories and processors, respectively.

The memory 110 includes a data storing unit 111, an Operating System (OS) program 112, an application program 113, a Graphic User Interface (GUI) program 114, and an object identifying program 115, etc. The programs which are software components may be expressed in a set of instructions, in an instruction set, or in modules.

The memory 110 may store one or more programs including instructions for performing embodiments of the present invention.

The data storing unit 111 stores data generated while functions corresponding to the programs stored in the memory 110 are performed. The data storing unit 111 may store a code set for identifying an object. The code set may include at least four or more code values. In one embodiment, the code set may include at least two maximum reference code values, at least one minimum reference code value, and at least one ID code value. For example, the data storing unit 111 may include a first code set of a 3×3 type, which includes three maximum reference code values located at three of four corners of a square, one minimum reference code value located at the other of the four corners, and five ID code values, for an object of the square. For another example, the data storing unit 111 may include a second code set of a 4×4 type, which includes three maximum reference code values located at three of four corners of a square, one minimum reference code value located at the other of the four corners, and twelve ID code values, for an object of the square. In one embodiment, the code set may not be limited to an n×n type and be formed of a polygon or the other closed curve type.

The data storing unit 111 may map a code set onto a function corresponding to the code set and store the mapping information. In one embodiment, when an object corresponding to a stored code set is sensed from the touch screen 130, the data storing unit 111 may map the code set onto a specific function to perform the function of the electronic device 100, corresponding to the corresponding code set, and store the mapping information. For example, when the first code set is sensed, the data storing unit 111 may map the first code set onto a first function of the electronic device 100 to perform the first function of the electronic device 100 and store information indicating mapping relation between the first code set and the first function. For another example, when the second code set is sensed, the data storing unit 111 may map the second code set onto a second function of the electronic device 100 to perform the second function of the electronic device 100 and store information indicating mapping relation between the second code set and the second function.

The data storing unit 111 may store a mathematical equation for restoring ID codes based on a minimum reference code value. In one embodiment, the ID codes are codes used to identify each object by the electronic device 100. A code set for each of different objects may have ID codes of different values, a different number of ID codes, ID codes of different arrangement, or ID codes of different orders. For example, ID codes of a first code set for a first object may be 2, 3, 6, 8, and 7 and ID codes of a second code set for a second object may be 2, 3, 7, 6, and 8. In one embodiment, ID codes values of the first code set and ID code values of the second code set are identical. However, because sequence or arrangement of the ID codes values of the first code set and sequence or arrangement of the ID code values of the second code set are different, the first code set and the second code set may be identified for different objects.

The OS program 112 (e.g., an embedded OS such as Windows, Linux, Darwin, RTXC, UNIX, OS X, or VxWorks) includes several software components for controlling a general system operation. For example, control of this general system operation includes memory management and control, storage hardware (device) control and management, power control and management, etc. The OS program 112 performs a function for smoothly communicating among several hardware components (devices) and software components (modules).

The application program 113 includes applications, such as a browser function application, an email function application, a message function application, a word processing function application, an address book function application, a widget function application, a Digital Right Management (DRM) function application, a voice recognition function application, a voice copy function application, a position determining function application, a location based service function application, a call function application, etc.

The GUI program 114 may include at least one software component for providing a UI using graphics between a user and the electronic device 100. The GUI program 114 includes at least one software component for displaying UI information on the touch screen 130. The GUI program 114 includes an instruction for displaying a graphic element corresponding to a corresponding function when performing the function corresponding to a code set of an object in the electronic device 100. For example, when a function mapped to a code set of a first object is changing a color of a font to black, the GUI program 114 may change a color of a displayed font to black and display the black font on the touch screen 130. For another example, when a function corresponding to a code set of a second object is displaying a first image, the GUI program 114 may display the first image on the touch screen 130.

The GUI program 114 may include an instruction for displaying a message indicating that an object located within a threshold distance of the touch screen 130 is identified. For example, the GUI program 114 may display a pop-up message indicating that a first object located within a threshold distance of the touch screen is identified.

The object identifying program 115 may sense an approach of an object. The object identifying program 115 may sense an object located within a threshold distance from the touch screen 130. In one embodiment, the sensed object may contain at least one conductive substance having sufficient permittivity which may be sensed by a touch.

The object identifying program 115 may sense the conductive substance of the sensed object and generate a code set based on permittivity of the conductive substance. In one embodiment, the object identifying program 115 may sense at least one or more conductive substances from the sensed object, verify permittivity of each of the sensed conductive substances, generate code values based on the verified permittivity, and generate a code set including the generated code values. In one embodiment, the higher the verified permittivity, the higher code value the object identifying program 115 may generate. The code set may include at least three maximum reference code values, one minimum reference code value, and at least one ID code value. A difference value between the maximum reference code value and the minimum reference code value may be preset. For example, a difference value between the maximum reference code value and the minimum reference code value may be preset to 10.

The object identifying program 115 may sense a conductive substance of the sensed object and generate a code set based on a distance between the touch screen 130 and the conductive substance. In one embodiment, the object identifying program 115 may sense at least one or more conductive substances from the sensed object, verify distances between the touch screen 130 and the sensed conductive substances, generate code values based on the verified distances, and generate a code set including the generated code values. In one embodiment, the farther the verified distance, the higher code value the object identifying program 115 may generate.

The object identifying program 115 may store the generated code set as a code set for identifying the corresponding object. In one embodiment, a function for storing the generated code set as the code set for identifying the object may be performed when a code set setting event is generated by a request of the user.

The object identifying program 115 may identify a currently sensed object using the generated code set. The object may be sensed using a proximity touch recognition function (or a hovering method). In one embodiment, the object identifying program 115 may verify a tilt and a rotating degree of the sensed object based on the generated code set and identify the object. The object identifying program 115 may verify whether three maximum reference code values are identical in the generated code set and verify the tilt and the rotating degree of the sensed object. If the three maximum reference code values are identical, the object identifying program 115 may determine that the sensed object is horizontally located above the touch screen 130. On the other hand, when at least one of the three maximum reference code values has a different value, the object identifying program 115 may determine that the sensed object is tilted or rotated with respect to the touch screen 130. In one embodiment, when it is determined that the sensed object is horizontally located above the touch screen 130, the object identifying program 115 may identify the object based on ID codes of the generated code set. When it is determined that the sensed object is titled or rotated, the object identifying program 115 may restore ID codes of the generated code set and identify the corresponding object based on the restored ID codes. That is, when the sensed object is tilted or rotated as a result of analyzing the generated code set, the object identifying program 115 may determine offset values for allowing the three maximum reference code values to have the same value based on the generated code set, restore ID codes using the offset values, and identify the sensed object. In one embodiment, to restore the ID codes of the code set using the offset values is to allow the corresponding code set to have the same value as a code set sensed when the corresponding object is horizontally located over the touch screen 130.

When the three maximum reference code values of the sensed object are identical, the object identifying program 115 determines that the corresponding object is horizontally located above the touch screen 130 and restores ID code values based on a minimum reference code value. The object identifying program 115 may restore the ID codes by subtracting the minimum reference code value from each of the ID code values of the object. In one embodiment, the object identifying program 115 then verifies whether the restored ID codes are identical to ID codes of a code set previously stored in the data storing unit 111. If the restored ID codes are identical to the ID codes of the code set which is previously stored, the object identifying program 115 identifies the sensed object as an object corresponding to the corresponding code set previously stored and performs a function of the electronic device 100, corresponding to the corresponding ID code. On the other hand, if the restored ID codes are not identical to the ID codes of the code set which is previously stored, the object identifying program 115 determines that the sensed object is not an object preset (or previously registered) in the electronic device 100.

When the three maximum reference code value of the sensed object are not identical, the object identifying program 115 determines that the corresponding object is not horizontally located above the touch screen 130 and verifies how many maximum reference code values are identical. If two maximum reference code values are identical, the object identifying program 115 may determine that the corresponding object is tilted or rotated based on a first axis. In one embodiment, the object identifying program 115 restores ID codes value using offset values of the first axis, which are calculated based on maximum reference code values, and a minimum reference code value. In one embodiment, the object identifying program 115 may restore the ID code value by calculating the offset values of the first axis using two maximum reference code values which are different and are located on the same row or column, adding the calculated offset values of the first axis to each of code values of the code set, and adding the minimum reference code value to each of ID code values of the object. In one embodiment, the object identifying program 115 then verifies whether the restored ID codes are identical to ID codes of a code set which is previously stored in the data storing unit 111. If the restored ID codes are identical to the ID codes which are previously stored, the object identifying program 115 identifies the sensed object as an object corresponding to the corresponding code set previously stored and performs a function of the electronic device 100, corresponding to the corresponding ID code. On the other hand, when the restored ID codes are not identical to the ID codes of the code set which is previously stored in the data storing unit 111, the object identifying program 115 determines that the sensed object is not an object preset in the electronic device 100.

If all of the three maximum reference code values are not identical, the object identifying program 115 may determine that the object is tilted or rotated based on the first axis and a second axis. Accordingly, the object identifying program 115 restores ID code values using offset values of the first axis, offset values of the second axis, both of which are calculated based on a maximum reference code value, and a minimum reference code value. In one embodiment, the object identifying program 115 may restore the ID code values by calculating the offset values of the first and second axes based on one maximum reference code value, adding the calculated offset values of the first axis to each of code values of the code set, adding the offset values of the second axis to each of the code values of the code set, and subtracting the minimum reference code value from each of ID codes of the object. In one embodiment, the object identifying program 115 verifies whether the restored ID codes are identical to ID codes of a code set which is previously stored in the data storing unit 111. If the restored ID codes are identical to the ID codes of the code set which is previously stored in the data storing unit 111, the object identifying program 115 identifies the sensed object as an object corresponding to the corresponding code set previously stored and performs a function of the electronic device 100, corresponding to the corresponding ID code. On the other hand, when the restored ID codes are not identical to the ID codes of the code set which is previously stored in the data storing unit 111, the object identifying program 115 determines that the sensed object is not an object preset in the electronic device 100.

When the sensed object is not the object preset in the electronic device 100, the object identifying program 115 may display a message asking the user about whether to set a code set of the sensed object. When the setting of the code set is requested, the object identifying program 115 may set a sensed or restored code set to a code set for identifying the corresponding object and map a specific function onto the set code set.

The processor 120 may include at least one processor and a peripheral interface. The processor 120 executes a specific program (instruction set) stored in the memory 110 and performs a plurality of specific functions corresponding to the program.

The touch screen 130 is a touch-sensitive display and provides an interface for touch input/output between the electronic device 100 and the user. The touch screen 130 senses a touch (or contact) through a touch sensor, transmits sensed touch input to the electronic device 100, and visually provides output from the electronic device 100 to the user. The touch screen 130 provides visual output such as texts, graphics, and videos to the user, in response to touch input.

The touch screen 130 includes a touch sensing surface for sensing touch input of the user. The touch screen 130 senses touch input of the user by a haptic touch, a tactile touch, and a combined type of them. For example, a touch sensing point of the touch screen 130 corresponds to a width of a digit used in a touch on a touch sensing surface. Also, the touch screen 130 senses a touch by an external device such as a stylus pen on a touch sensing surface. The detected touch is converted into interaction corresponding to a user interface target (e.g., a soft key) displayed on the touch screen 130.

The touch screen 130 may be various displays such as a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), and a Flexible LED (FLED) but is not limited thereto. Also, the touch screen 130 may sense the start of a touch on a touch sensing surface, the movement of the touch, or the stop or end of the touch using several touch detection (or sensing) technologies such as capacitive, resistive, infrared, and surface acoustic wave detection technologies. The touch screen 130 may sense a multi-touch, in which two or more touches are simultaneously sensed.

The touch screen 130 may sense an object which does not come in contact with a touch surface of the touch screen 130 directly and is separated within a threshold distance, using a hovering method. The touch screen 130 may sense an approach of an object located within a threshold distance from the touch screen 130 and recognize the corresponding approach as a touch.

The touch screen 130 may sense an object when a part of the object comes in contact with a touch surface of the touch screen 130 directly or when the entire object comes in contact with a touch surface of the touch screen 130 directly.

The touch screen 130 may sense permittivity of a conductive substance. Particularly, when the object contains a plurality of conductive substances, the touch screen 130 may verify permittivity of each of the conductive substances contained in the object.

The communication unit 140 may include a Radio Frequency (RF) receiver and transceiver and/or an optical (e.g., infrared) receiver and transceiver. The communication unit 140 may include a communication system which supports any one of a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a Near Field Communication (NFC) network, an Infrared Data Association (IrDA), a WiMax network, or/and a Bluetooth network, but is not be limited thereto. When a sensed object is an electronic device which may perform data transmission using wireless communication, the communication unit 140 may perform data transmission and reception with the sensed object according to control of the user.

Figure 1B:
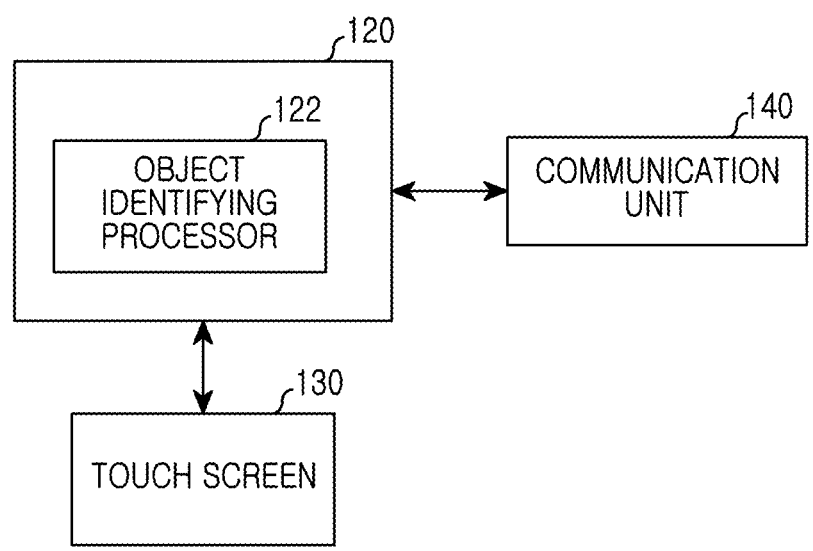
FIG. 1B is a block diagram illustrating a detailed configuration of a processor for identifying an object according to an embodiment of the present invention.

FIG. 1B is a block diagram illustrating a detailed configuration of a processor for identifying an object according to an embodiment of the present invention.

Referring to FIGS. 1A and 1B, the processor 120 includes an object identifying processor 122.

The object identifying processor 122 may sense a conductive substance of a sensed object and generate a code set based on permittivity of the conductive substance. In one embodiment, the object identifying processor 122 may sense at least one or more conductive substances from the sensed object, verify permittivity of each of the sensed conductive substances, generate code values based on the verified permittivity, and generate a code set including the generated code values. In one embodiment, the higher the verified permittivity, the higher code value the object identifying program 115 may generate. The code set may include at least three maximum reference code values, one minimum reference code value, and at least one ID code value. A difference value between the maximum reference code value and the minimum reference code value may be preset. For example, a difference value between the maximum reference code value and the minimum reference code value may be preset to 10.

The object identifying processor 122 may sense a conductive substance of the sensed object and generate a code set based on a distance between the touch screen 130 and the conductive substance. In one embodiment, the object identifying processor 122 may sense at least one or more conductive substances from the sensed object, verify distances between the touch screen 130 and the sensed conductive substances, generate code values based on the verified distances, and generate a code set including the generated code values. In one embodiment, the farther the verified distance, the higher code value the object identifying processor 122 may generate.

The object identifying processor 122 may store the generated code set as a code set for identifying the corresponding object. In one embodiment, a function for storing the generated code set as the code set for identifying the object may be performed when a code set setting event is generated by a request of a user.

The object identifying processor 122 may identify a currently sensed object using the generated code set. In one embodiment, the object may be sensed using a proximity touch recognition function (or a hovering method). In one embodiment, the object identifying processor 122 may verify a tilt and a rotating degree of the sensed object based on the generated code set and identify the object. The object identifying processor 122 may verify whether three maximum reference code values are identical to one another in the generated code set and verify the tilt and the rotating degree of the sensed object. If the three maximum reference code values are identical, the object identifying processor 122 may determine that the sensed object is horizontally located above the touch screen 130. On the other hand, when at least one of the three maximum reference code values has a different value, the object identifying processor 122 may determine that the sensed object is tilted or rotated with respect to the touch screen 130. In one embodiment, when it is determined that the sensed object is horizontally located above the touch screen 130, the object identifying processor 122 may identify the object based on ID codes of the generated code set. When it is determined that the sensed object is titled or rotated, the object identifying processor 122 may restore ID codes of the generated code set and identify the corresponding object based on the restored ID codes. That is, when the sensed object is tilted or rotated as a result of analyzing the generated code set, the object identifying processor 122 may determine offset values for allowing the three maximum reference code values to have the same value based on the generated code set, restore ID codes using the offset value, and identify the sensed object. In one embodiment, to restore the ID codes of the code set using the offset values is to allow the corresponding code set to have the same value as a code set sensed when the corresponding object is horizontally located over the touch screen 130.

When the three maximum reference code values of the sensed object are identical, the object identifying processor 122 determines that the corresponding object is horizontally located above the touch screen 130 and restores ID code values based on a minimum reference code value. The object identifying processor 122 may restore the ID codes by subtracting a minimum reference code value from each of the ID code values of the object. The object identifying processor 122 then verifies whether the restored ID codes are identical to ID codes of a code set previously stored in the data storing unit 111. If the restored ID codes are identical to the ID codes of the code set which is previously stored, the object identifying processor 122 identifies the sensed object as an object corresponding to the corresponding code set previously stored and performs a function of the electronic device 100, corresponding to the corresponding ID code. On the other hand, if the restored ID codes are not identical to the ID codes of the code set which is previously stored, the object identifying processor 122 determines that the sensed object is not an object preset (or previously registered) in the electronic device 100.

When the three maximum reference code value of the sensed object are not identical, the object identifying processor 122 determines that the corresponding object is not horizontally located above the touch screen 130 and verifies how many maximum reference code values are identical. If two maximum reference code values are identical, the object identifying processor 122 may determine that the corresponding object is tilted or rotated based on a first axis. The object identifying processor 122 restores ID code values using offset values of the first axis, which are calculated based on maximum reference code values, and a minimum reference code value. In one embodiment, the object identifying processor 122 may restore the ID code values by calculating the offset values of the first axis using two maximum reference code values which are different and are located on the same row or column, adding the calculated offset value of the first axis to each of code values of the code set, and adding the minimum reference code value to each of ID code values of the object. The object identifying processor 122 then verifies whether the restored ID codes are identical to ID codes of a code set which is previously stored in the data storing unit 111. If the restored ID codes are identical to the ID codes previously stored, the object identifying processor 122 identifies the sensed object as an object corresponding to the corresponding code set previously stored and performs a function of the electronic device 100, corresponding to the corresponding ID codes. On the other hand, when the restored ID codes are not identical to the ID codes of the code set which is previously stored in the data storing unit 111, the object identifying processor 122 determines that the sensed object is not an object preset in the electronic device 100.

If all of the three maximum reference code values are not identical, the object identifying processor 122 may determine that the object is tilted or rotated based on the first axis and a second axis. The object identifying processor 122 restores ID code values using offset values of the first axis and offset values of the second axis, both of which are calculated based on a maximum reference code value, and a minimum reference code value. In one embodiment, the object identifying processor 122 may restore the ID code values by calculating the offset values of the first and second axes based on one maximum reference code value, adding the calculated offset values of the first axis to each of code values of the code set, adding the offset value of the second axis to each of ID code values of the code set, and subtracting the minimum reference code value from each of the ID codes of the object. The object identifying processor 122 then verifies whether the restored ID codes are identical to ID codes of a code set which is previously stored in the data storing unit 111. If the restored ID codes are identical to the ID codes of the code set which is previously stored in the data storing unit 111, the object identifying processor 122 identifies the sensed object as an object corresponding to the corresponding code set previously stored and performs a function of the electronic device 100, corresponding to the corresponding ID codes. On the other hand, when the restored ID codes are not identical to the ID codes of the code set which is previously stored in the data storing unit 111, the object identifying processor 122 determines that the sensed object is not an object preset in the electronic device 100.

When it is determined that the sensed object is not the object preset in the electronic device 100, the object identifying processor 122 may display a message asking the user about whether to set a code set of the sensed object. When the setting of the code set is requested, the object identifying processor 122 may set a sensed or restored code set to a code set for identifying the corresponding object and map the set code set onto a specific function.

Figure 2A:
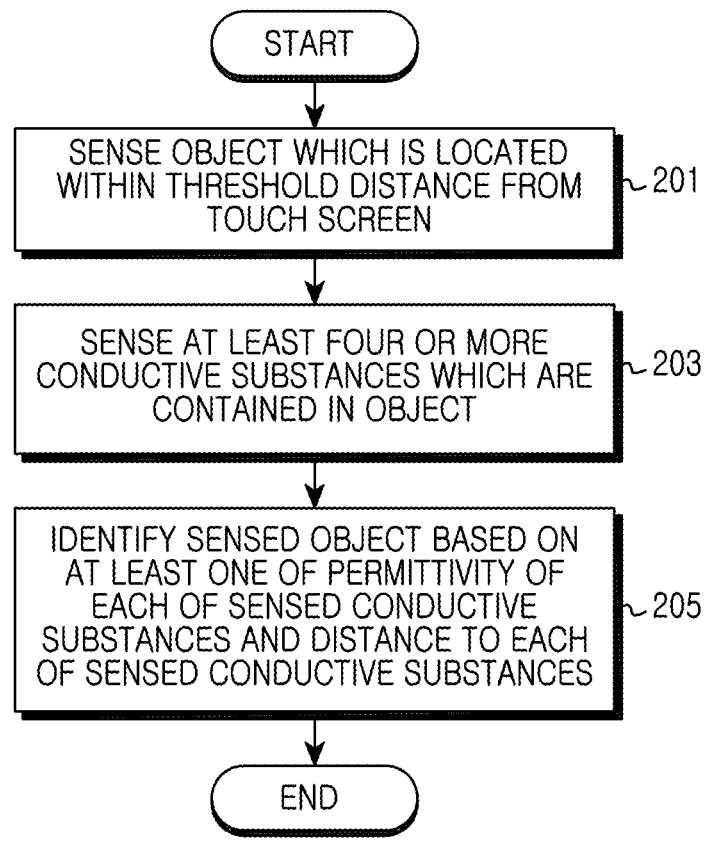
FIG. 2A is a flowchart illustrating a process of identifying an object based on permittivity and a distance of an object in an electronic device according to an embodiment of the present invention.

FIG. 2A is a flowchart illustrating a process of identifying an object based on permittivity and a distance of an object in an electronic device according to an embodiment of the present invention.

Referring to FIGS. 1A and 2A, the electronic device 100 senses an object which is located within a threshold distance from the touch screen 130 in step 201. The electronic device 100 may sense hovering by touch subjects. For example, the electronic device 100 may sense that a first object is located within a threshold distance of the touch screen 130.

The electronic device 100 then senses at least four or more conductive substances which are contained in the object in step 203. That is, the electronic device 100 senses a plurality of conductive substances which are contained in the sensed object. In one embodiment, the plurality of conductive substances form a specific pattern. The specific pattern is formed of an n×n type, a polygon, and the other closed curve type. For example, the electronic device 100 may sense an object in which a plurality of conductive substances form a first pattern and have different distances from the touch screen 130. For another example, the electronic device 100 may sense an object in which a plurality of conductive substances form a first pattern and have same distances from the touch screen 130. In one embodiment, the object may contain a non-conductive substance such that a plurality of conductive substances having different distances from the touch screen 130 have the same height in external appearance.

The electronic device 100 identifies the sensed object based on at least one of permittivity of each of the sensed conductive substances and a distance to each of the sensed conductive substances. In one embodiment, the electronic device 100 may verify permittivity of each of the sensed conductive substances and a distance from the touch screen 130, generate different code values according to the verified permittivity and distance, and identify the object based on the generated code values. If the corresponding object is identified, the electronic device 100 may perform its function corresponding to the corresponding object.

Figure 2B:
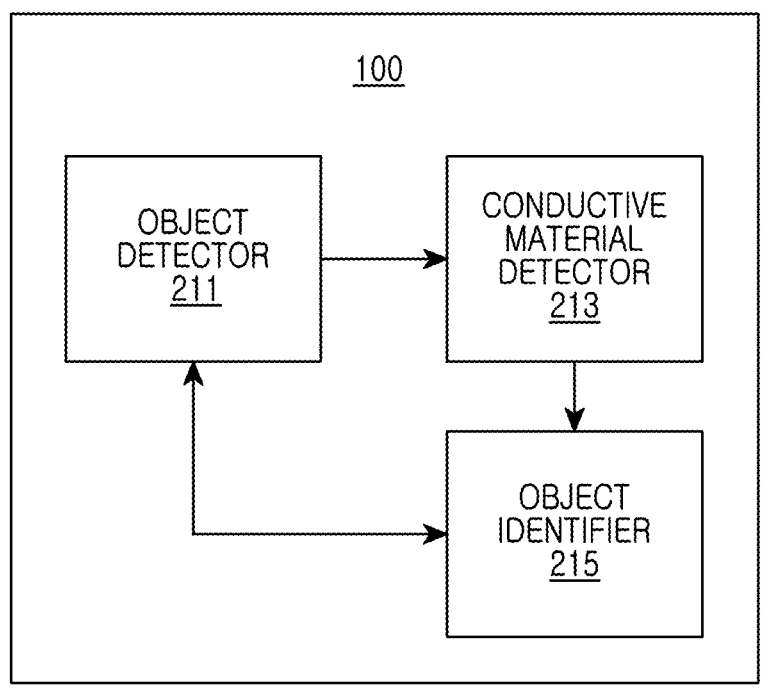
FIG. 2B illustrates a configuration of an electronic device for identifying an object based on permittivity and a distance of an object according to one embodiment of the present invention.

FIG. 2B is a block diagram illustrating a configuration of an electronic device for identifying an object based on permittivity and a distance of an object according to an embodiment of the present invention.

Referring to FIGS. 1A and 2B, the electronic device 100 may include a object detector 211 for sensing an object which is located within a threshold distance from the touch screen 130. In one embodiment, the electronic device 100 may include a means for sensing a multi-touch and a means for sensing hovering.

In one embodiment, the electronic device 100 may include a conductive material detector 213 for sensing at least four or more conductive substances which are contained in the object. In one embodiment, the object may contain each of a plurality of conductive substances having different permittivity and each of a plurality of conductive substances having different distances from the touch screen 130, or contains a combination of both.

In one embodiment, the electronic device 100 may include a object identifier 215 for identifying the sensed object based on at least one of permittivity of each of the sensed conductive substances and a distance to each of the sensed conductive substances. In one embodiment, the electronic device 100 may include a means for sensing permittivity of a conductive substance and a means for sensing a distance of a conductive substance. In one embodiment, when information of the sensed object is identical to object information which is previously stored, the electronic device 100 may include a means for performing a function of the electronic device.

Figure 3A:
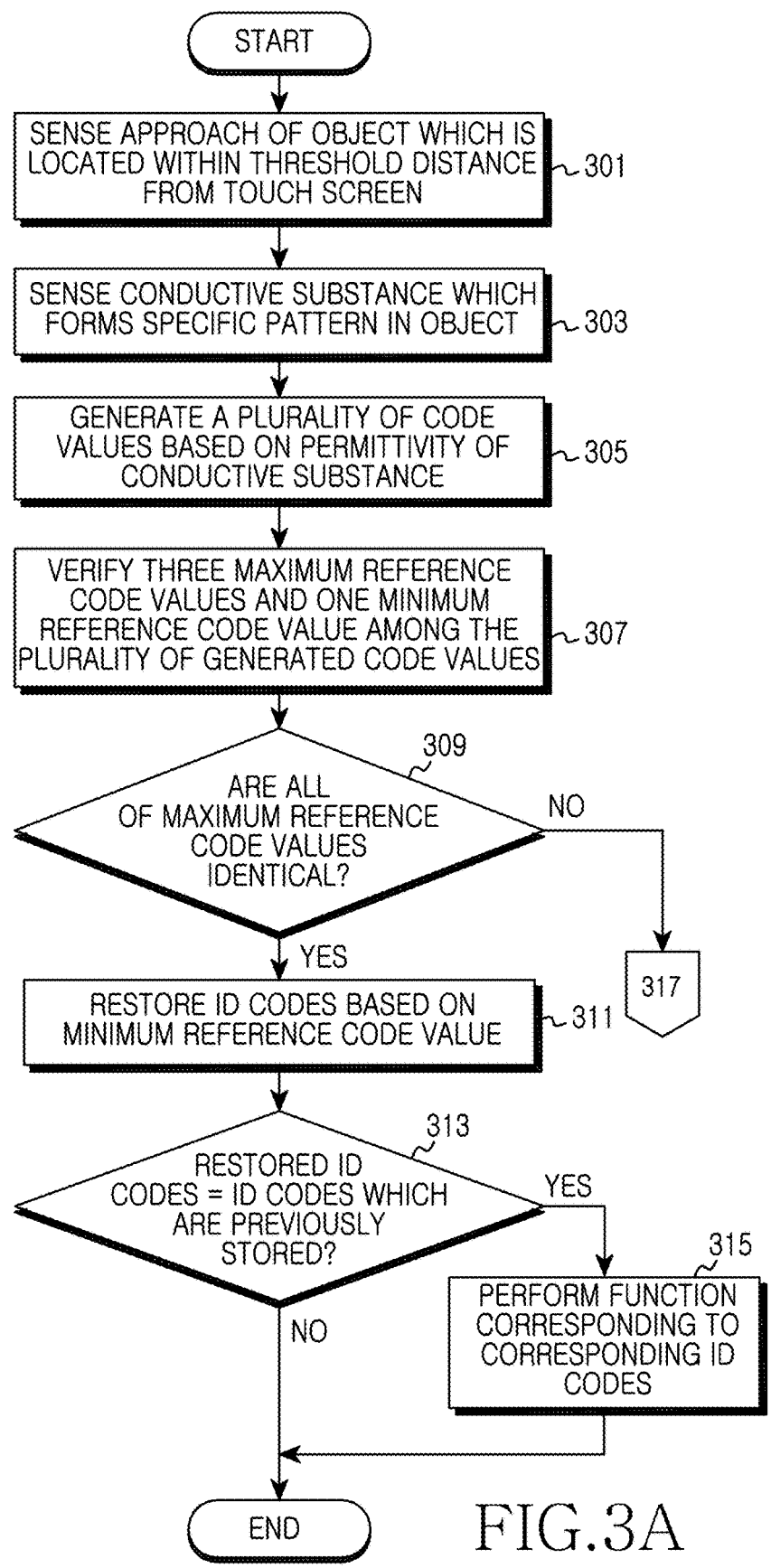
FIGS. 3A and 3B are flowcharts illustrating a process of verifying ID codes of an object and identifying the object in an electronic device according to an embodiment of the present invention.
Figure 3B:
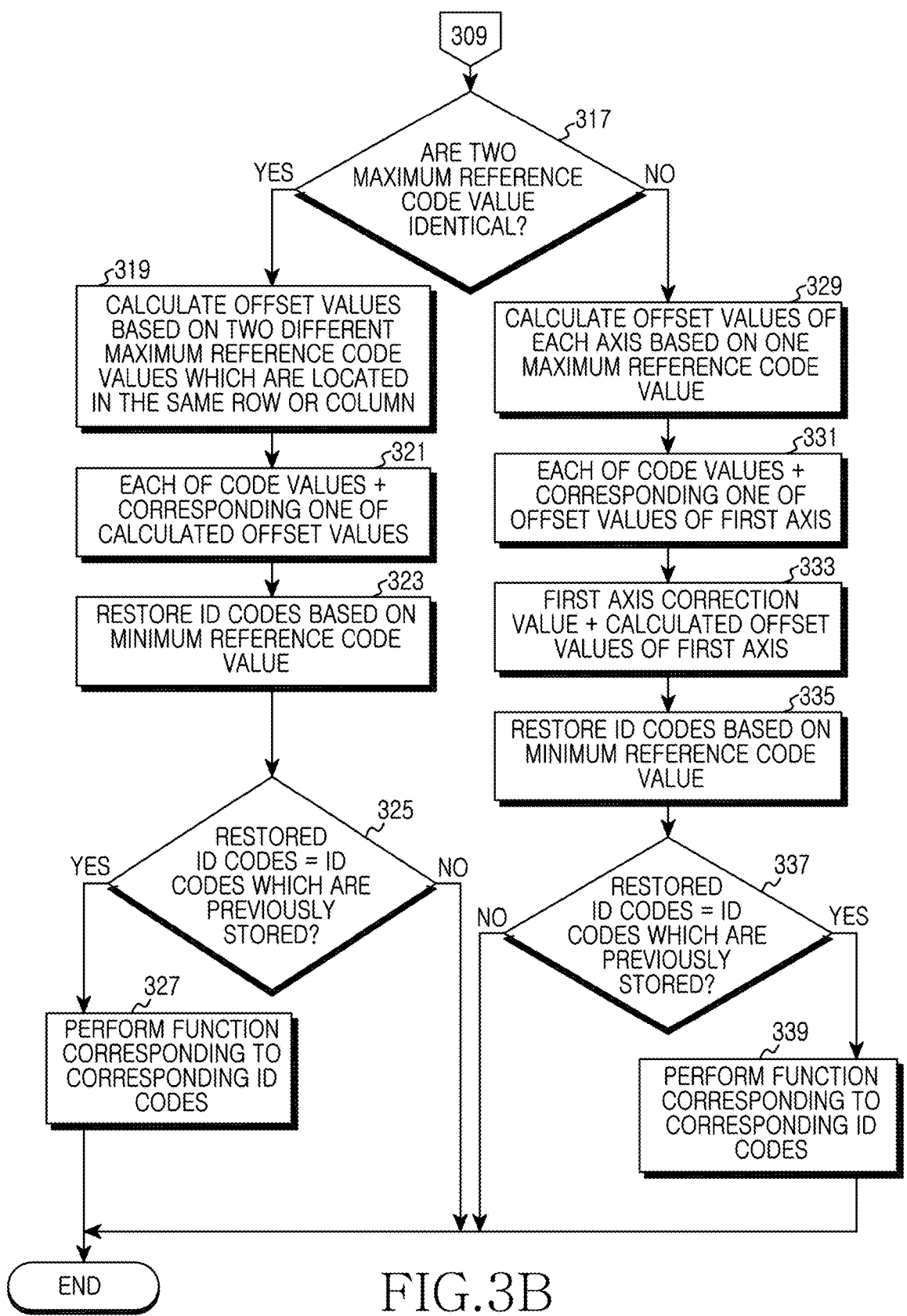

FIGS. 3A and 3B are flowcharts illustrating a process of verifying ID codes of an object and identifying the object in an electronic device according to an embodiment of the present invention.

Hereinafter, for convenience of description, a description will be given under the assumption that a 3×3 code set includes three maximum reference code values, one minimum reference code value, and five ID code values.

Referring to FIGS. 1A, 3A, and 3B, the electronic device 100 senses an approach of an object which is located within a threshold distance from the touch screen 130 in step 301. In one embodiment, the sensed object contains at least one conductive substance having sufficient permittivity to be sensed by a touch.

Figure 4A:
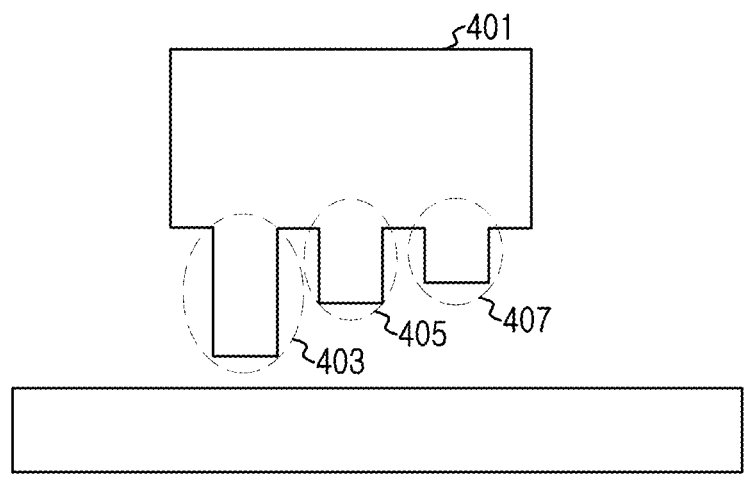
FIGS. 4A through 4C illustrate objects which are located within a threshold distance of a touch screen in an electronic device according to an embodiment of the present invention.
Figure 4B:
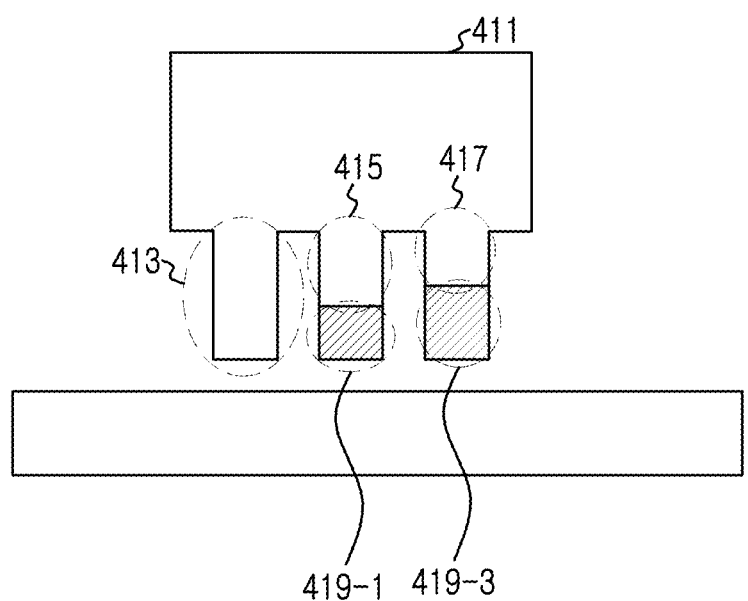
Figure 4C:
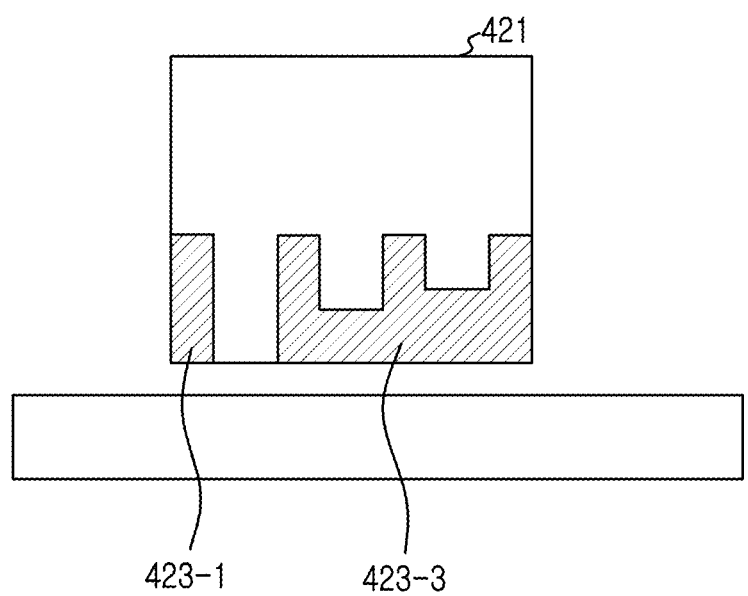

The electronic device 100 proceeds to step 303 and senses a conductive substance which forms a specific pattern in the object. For example, the electronic device 100 may sense, as illustrated in FIG. 4A, an object in which a specific pattern is formed by projections 403, 405, and 407 of a conductive substance 401. For another example, the electronic device 100 may sense, as illustrated in FIG. 4B, an object in which a conductive substance 411 and non-conductive substances 419-1 and 419-3 are combined such that projections 413, 415, and 417 of the conductive substance 411 are identically manufactured with projections having the same height. For another example, the electronic device 100 may sense, as illustrated in FIG. 4C, an object in which a conductive substance 421 and non-conductive substances 423-1 and 423-3 are combined with lower parts of the object having the same height.

Figure 5A:
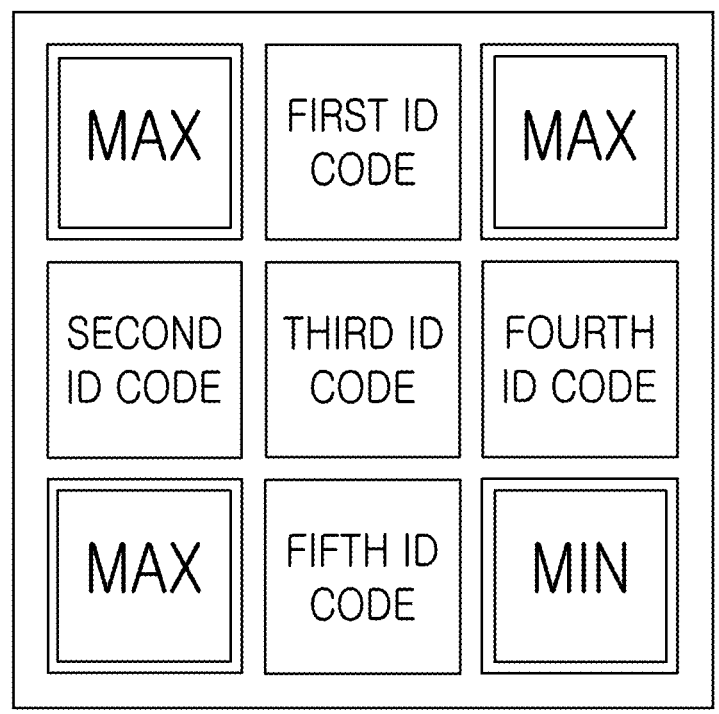
FIGS. 5A and 5B illustrate a configuration of a code set generated as a square in an electronic device according to an embodiment of the present invention.
Figure 5B:
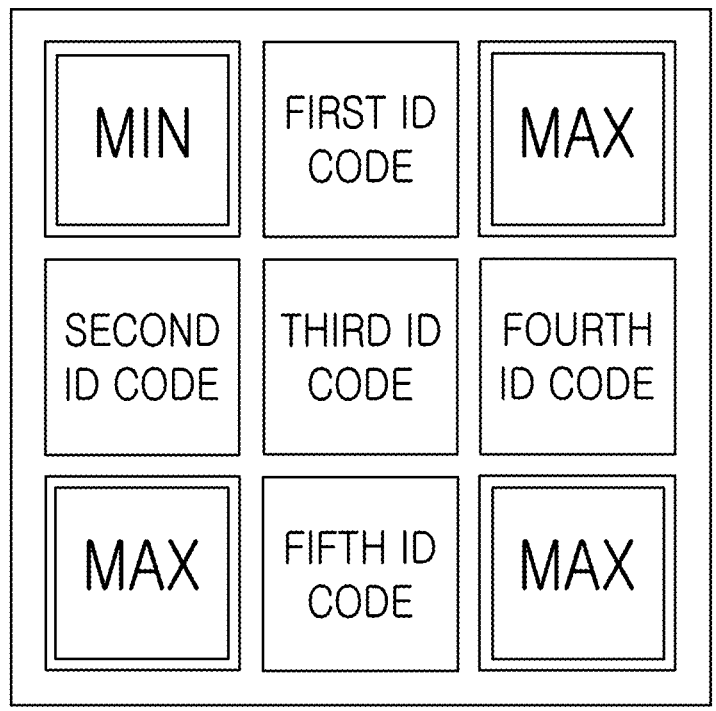

The electronic device 100 generates code values based on permittivity of the conductive substance in step 305. The electronic device 100 may generate a code set including at least four or more code values. In one embodiment, the code set includes at least three maximum reference code values, at least one minimum reference code value, and at least one ID code value. For example, the electronic device 100 may generate, as illustrated in FIG. 5A, a code set of a 3×3 type, including three maximum reference code values located at three corners, one minimum reference value located at a right lower corner, and five ID code values located at the other positions. In one embodiment, positions of the maximum reference code values, the minimum reference code value, and ID codes may be different from one another. For example, the electronic device 100 may generate, as illustrated in FIG. 5B, a code set of a 3×3 type, including three maximum reference code values located at three corners, one minimum reference code value located at a left upper corner, and five ID code values located at the other positions.

The electronic device 100 proceeds to step 307 and verifies three maximum reference code values and one minimum reference code value among the plurality of generated code values. The electronic device 100 verifies whether all of the maximum reference code values are identical in step 309. In one embodiment, a difference value between the maximum reference code value and the minimum reference code value may be preset to always have a certain value.

If all the maximum reference code values of the code set are identical, the electronic device 100 proceeds to step 311 and restores ID codes based on the minimum reference code value. In one embodiment, the electronic device 100 may restore the ID codes by subtracting the minimum reference code value from each of the ID code values.

The electronic device 100 proceeds to step 313 and verifies whether the restored ID codes are identical to ID codes which are previously stored. That is, the electronic device 100 may verify whether information of the sensed object is previously stored by comparing the restored ID codes with the ID codes which are previously stored.

Figure 6A:
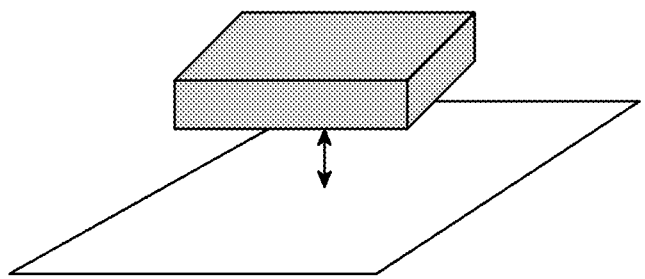
FIGS. 6A and 6B illustrate a process of identifying an object when a touch screen and the object are relatively close to each other in distance in an electronic device according to an embodiment of the present invention.
Figure 6B:
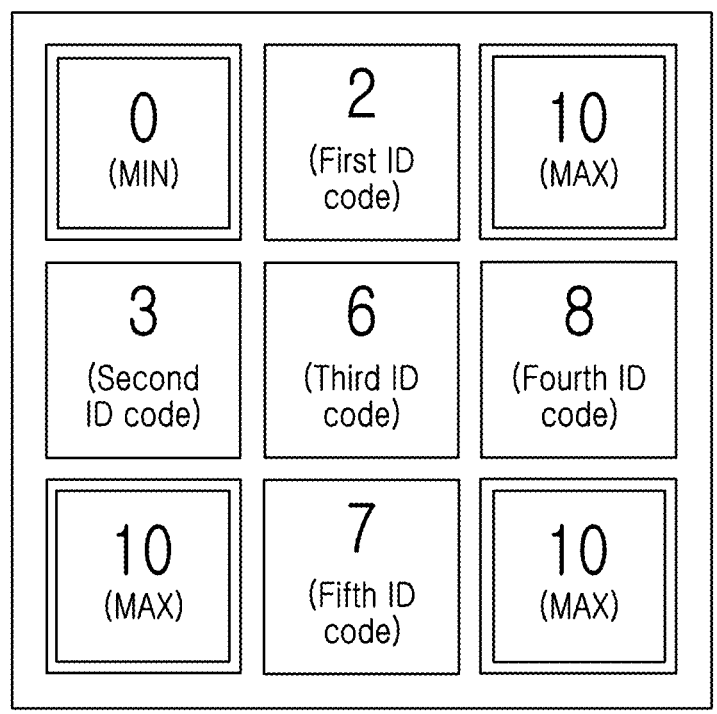
Figure 7A:
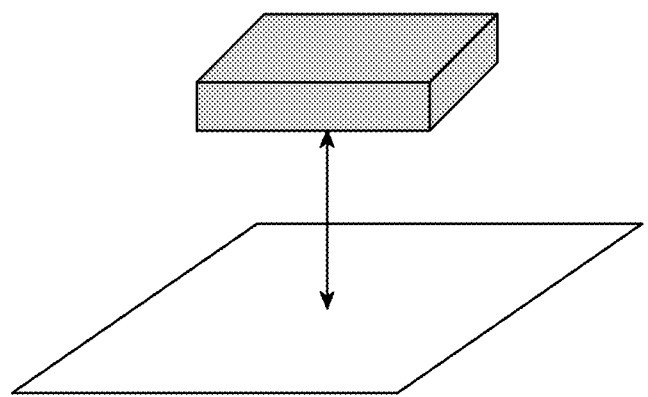
FIGS. 7A through 7C illustrate a process of identifying an object when a touch screen and the object are relatively far from each other in distance in an electronic device according to an embodiment of the present invention.
Figure 7B:
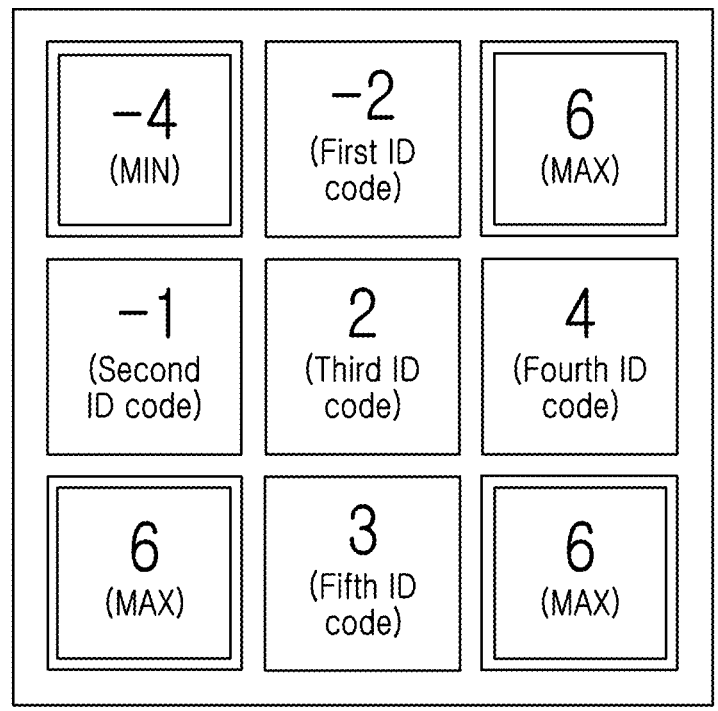
Figure 7C:
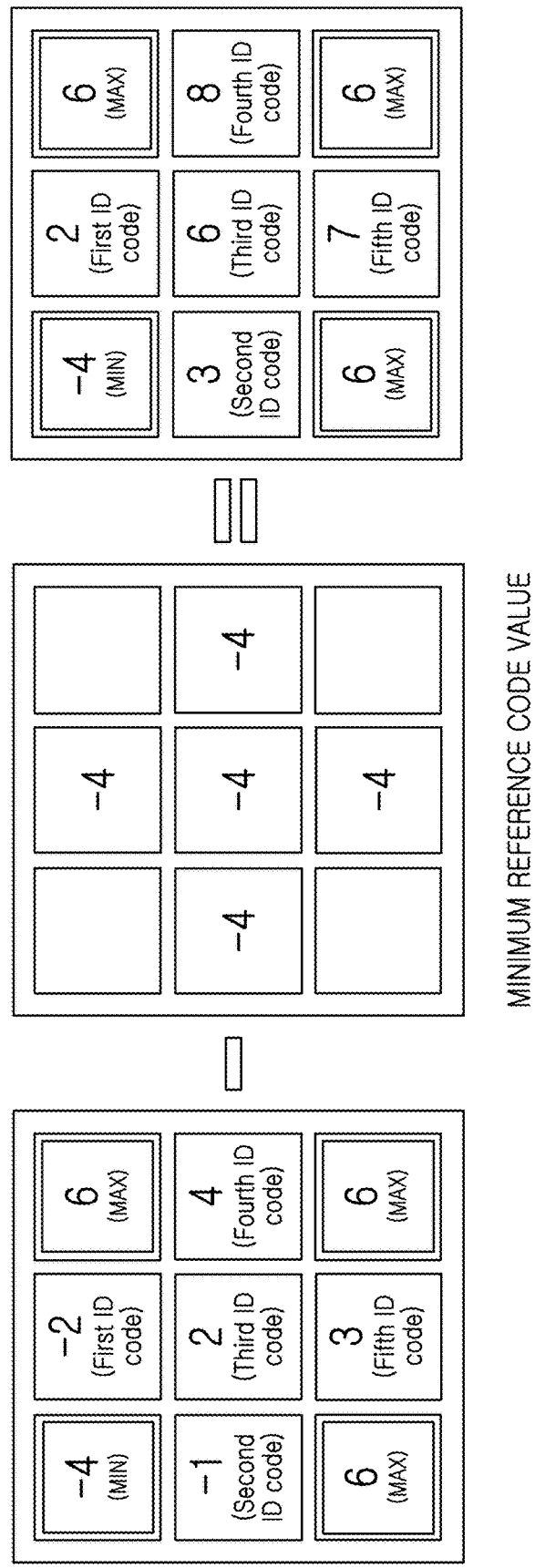

If the restored ID codes are identical to the ID codes which are previously stored, the electronic device 100 performs a function corresponding to the corresponding ID code in step 315. That is, when the ID codes of the sensed object are identical to the ID codes which are previously stored, the electronic device 100 may identify the sensed object and perform a function corresponding to the sensed object. For example, as illustrated in FIG. 6A, when a first object is sensed within a threshold distance of the touch screen 130, the electronic device 100 may generate, as illustrated in FIG. 6B, a code set including a plurality of code values based on permittivity and a distance of a conductive substance of the first object. In one embodiment, a difference value between a maximum reference code value and a minimum reference code value may be preset to be 10. The electronic device 100 verifies that all of maximum reference code values are identical as a result of analyzing the generated code set, restores ID codes by subtracting a minimum reference code value "0" from each of ID code values 2, 3, 6, 8, and 7, and verifies whether the restored ID code values 2, 3, 6, 8, and 7 are identical to ID code values which are previously stored. Thus, because the generated ID code values are identical to the ID code values which are previously stored, the electronic device 100 may perform a function corresponding to the corresponding code values. The electronic device 100 then ends the procedure. For another example, as illustrated in FIG. 7A, when the first object is sensed within a threshold distance of the touch screen 130, the electronic device 100 may generate, as illustrated in FIG. 7B, a code set including a plurality of code values based on permittivity and a distance of a conductive substance of the first object. In one embodiment, a difference value between a maximum reference code value and a minimum reference code value may be preset to be 10. The electronic device 100 verifies that all of maximum reference code values are identical as a result of analyzing the generated code set, restores ID codes by subtracting, as illustrated in FIG. 7C, a minimum reference code value "−4" from each of ID code values −2, −1, 2, 4 and 3 and verifies whether the restored ID code values 2, 3, 6, 8, and 7 are identical to ID code values which are previously stored. Thus, because the generated ID code values are identical to the ID code values which are previously stored, the electronic device 100 may perform a function corresponding to the corresponding code values. The electronic device 100 then ends the procedure.

On the other hand, when the restored ID codes are not identical to the ID codes which are previously stored, the electronic device 100 ends the procedure.

When all of the maximum reference code values are not identical in step 309, the electronic device 100 proceeds to step 317 and verifies whether two maximum reference code values are identical.

When two of the three maximum reference code values are identical, the electronic device 100 proceeds to step 319 and calculates offset values based on two different maximum reference code values which are located in the same row or column. That is, when two of three maximum reference code values are identical, the electronic device 100 determines that the sensed object is tilted or rotated based on a first axis and calculates offset values to horizontally adjust a position of the object which is tilted and rotated based on the first axis.

The electronic device 100 adds the calculated offset values to each of the code values in step 321. The electronic device 100 proceeds to step 323 and restores ID codes based on the minimum reference code value. In one embodiment, the electronic device 100 may restore the ID codes by adding the calculated offset values to each of the code values and subtracting the minimum reference code value from each of the ID code values The electronic device 100 proceeds to step 325 and verifies whether the restored ID codes are identical to ID codes which are previously stored.

Figure 8A:
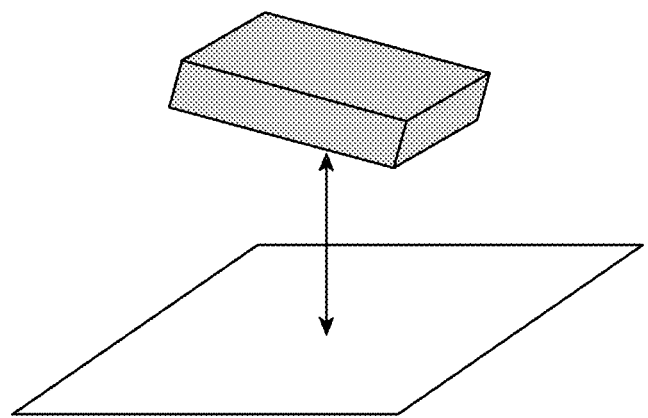
FIGS. 8A through 8F illustrate a process of identifying an object when an object which is located within a threshold distance of a touch screen is tilted based on one axis in an electronic device according to an embodiment of the present invention.
Figure 8B:
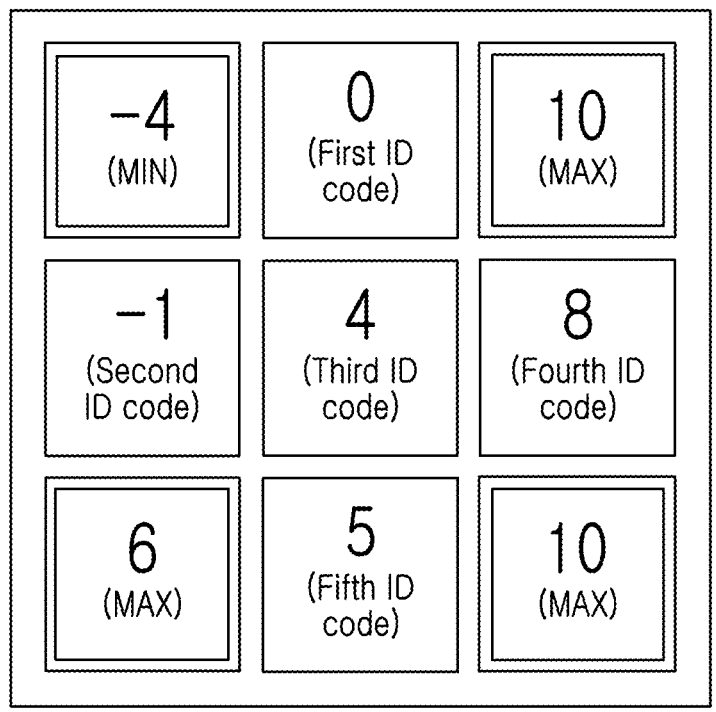
Figure 8C:
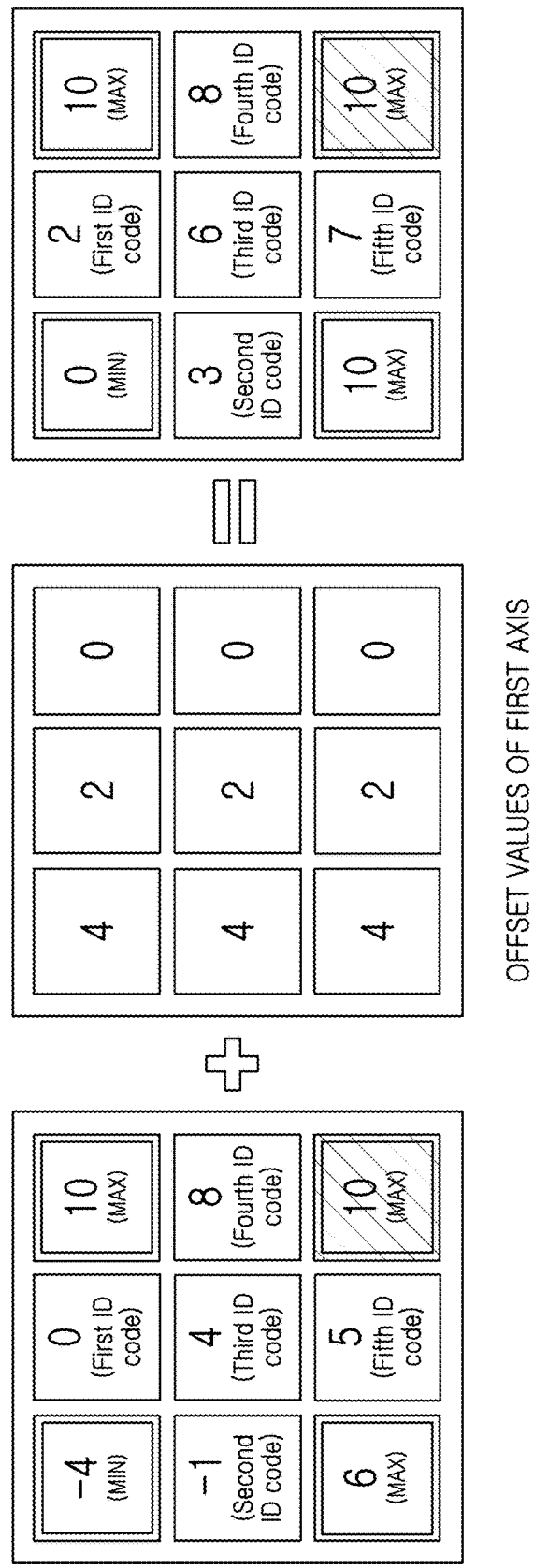
Figure 8D:
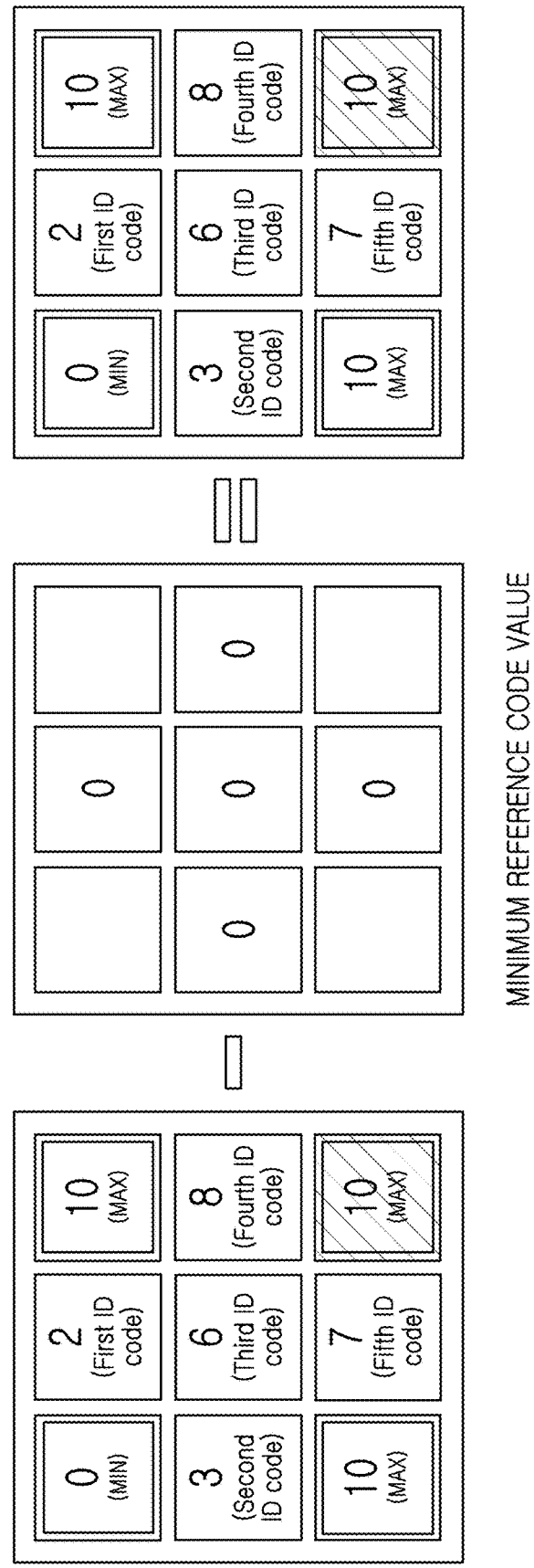
Figure 8E:
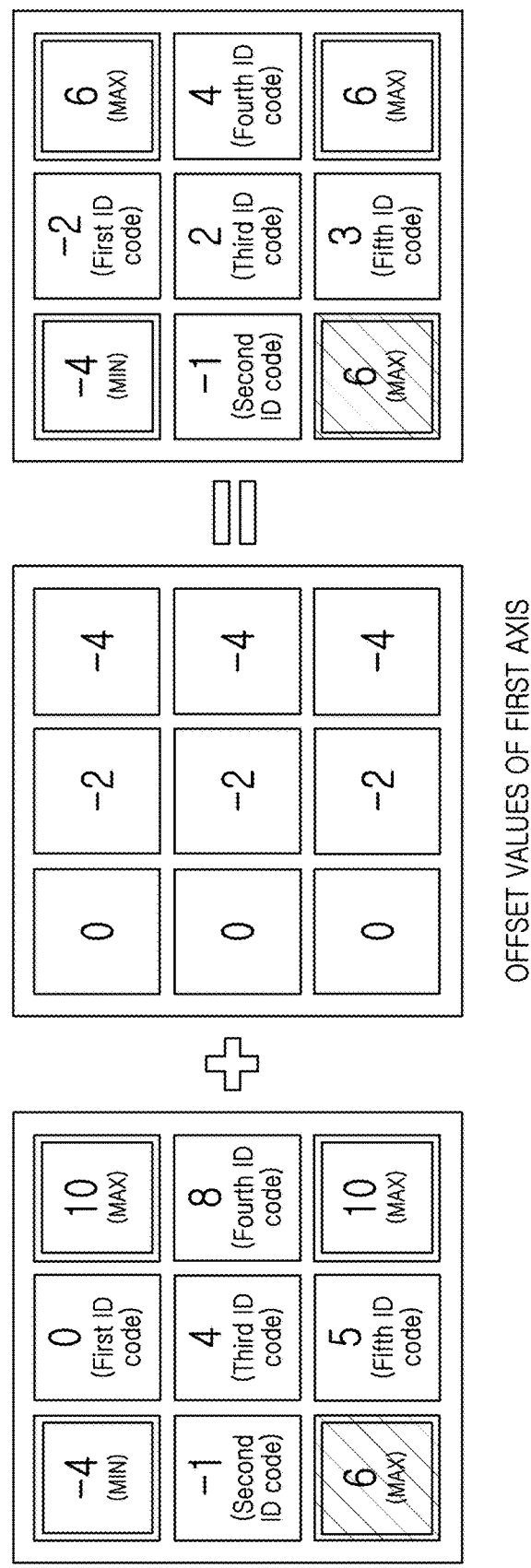
Figure 8F:
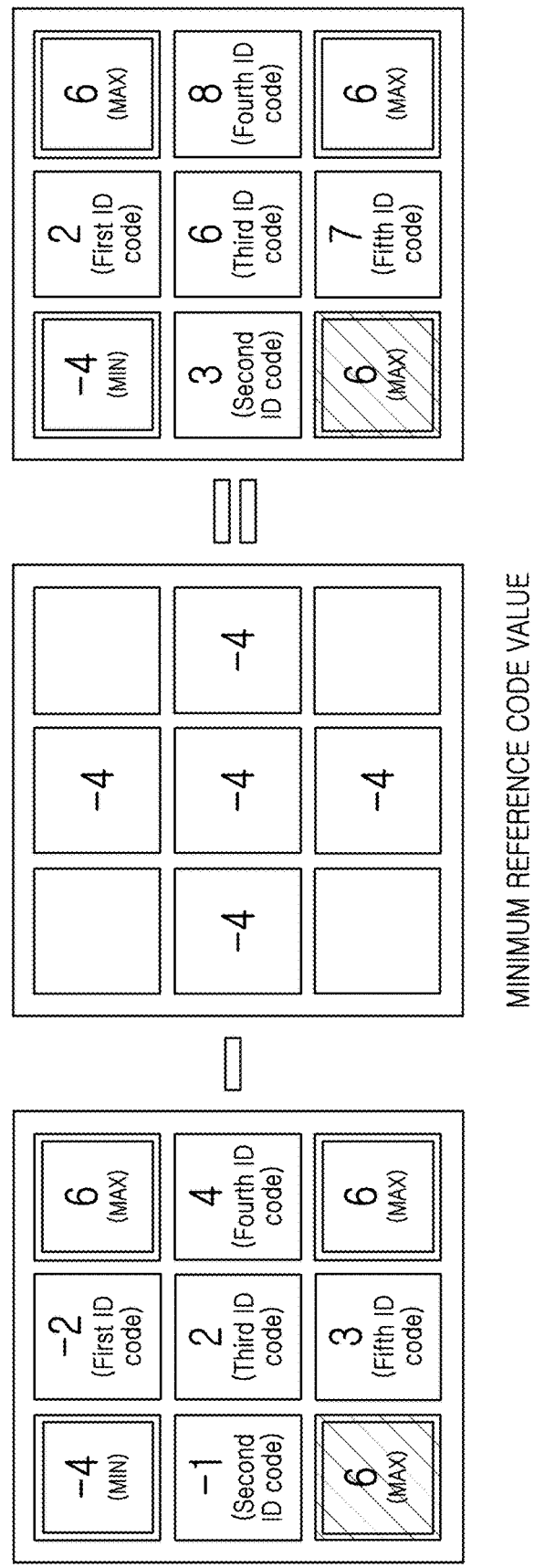

If the restored ID codes are identical to the ID codes which are previously stored, the electronic device 100 proceeds to step 327 and performs a function corresponding to the corresponding ID codes. For example, as illustrated in FIG. 8A, when a first object is sensed within a threshold distance of the touch screen 130, the electronic device 100 may generate, as illustrated in FIG. 8B, a code set including a plurality of code values based on permittivity and a distance of a conductive substance of the first object. In one embodiment, a difference value between a maximum reference code value and a minimum reference code value may be preset to be 10. The electronic device 100 verifies that two of three maximum reference code values are identical as a result of analyzing the generated code set and calculates offset values of the first axis based on two different maximum reference code values which are located in the same row or column. If offset values are calculated based on a maximum reference code value which is located at a right lower side, an offset value of a first column is 4, an offset value of a second column is 2, and an offset value of a third column is 0. The electronic device 100 adds, as illustrated in FIG. 8C, the calculated offset values of the first axis to each of the code values. As illustrated in FIG. 8D, the electronic device 100 may restore ID codes by subtracting a minimum reference code value "0" from each of the ID codes. Thus, because the restored ID code values 2, 3, 6, 8, and 7 are identical to ID codes which are previously stored, the electronic device 100 may perform a function corresponding to the corresponding code values. On the other hand, if offset values are calculated based on a maximum reference code value which is located at a left lower side, an offset value of a first column is 0, an offset value of a second column is −2, and an offset value of a third column is −4. The electronic device 100 adds, as illustrated in FIG. 8E, the calculated offset values of the first axis to each of the code values. As illustrated in FIG. 8F, the electronic device 100 may restore ID codes by subtracting a minimum reference code value "−4" from each of the ID codes. Thus, because the restored ID code values 2, 3, 6, 8, and 7 are identical to ID codes which are previously stored, the electronic device 100 may perform a function corresponding to the corresponding code values. The electronic device 100 then ends the procedure.

On the other hand, when the restored ID codes are not identical to the ID codes which are previously stored, the electronic device 100 ends the procedure.

When the two maximum reference code values are not identical in step 317, the electronic device 100 proceeds to step 329 and calculates offset values of each axis based on one maximum reference code value. That is, when there are no maximum reference code values are identical to one another among three maximum reference code values, the electronic device 100 determines that the sensed object is tilted or rotated based on a first axis and a second axis and calculates offset values to horizontally adjust a position of the object which is tilted or rotated based on the first axis and the second axis.

The electronic device 100 adds the calculated offset values of the first axis to each of the code values in step 331. The electronic device 100 proceeds to step 333 and adds offset values of the second axis to the first correction values corrected based on the offset values of the first axis. The electronic device 100 restores ID codes based on a minimum reference code value in step 335. In one embodiment, the electronic device 100 may restore ID codes by adding the calculated offset values of the first axis and the calculated offset values of the second axis to each of the code values and subtracting a minimum reference code value from each of the ID code values.

The electronic device 100 proceeds to step 337 and verifies whether the restored ID codes are identical to ID codes which are previously stored.

Figure 9A:
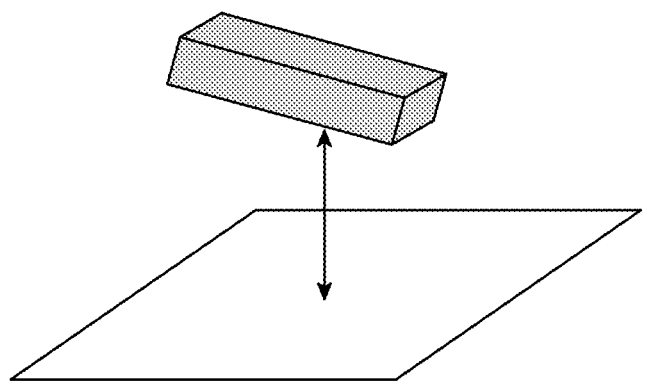
FIGS. 9A through 9H illustrate a process of identifying an object when an object which is located within a threshold distance of a touch screen is tilted based on two axes in an electronic device according to an embodiment of the present invention.
Figure 9B:
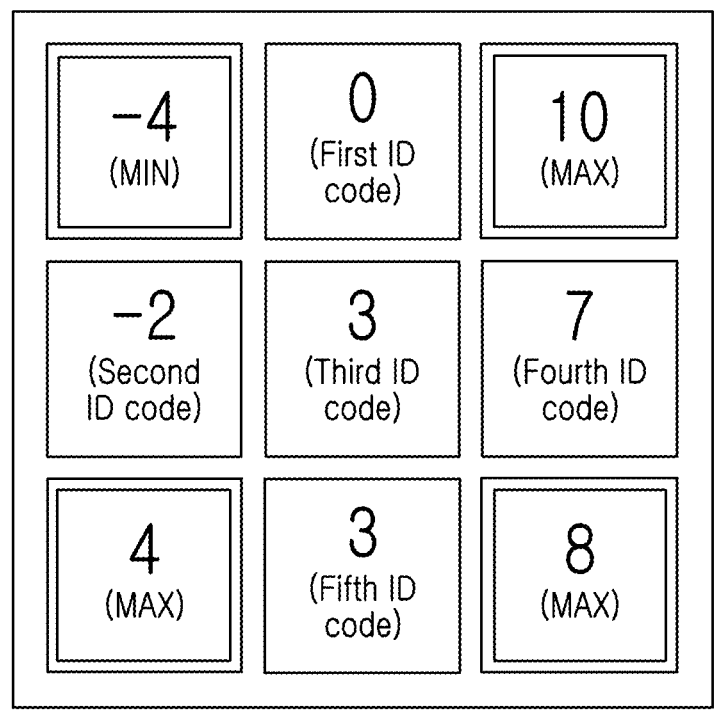
Figure 9C:
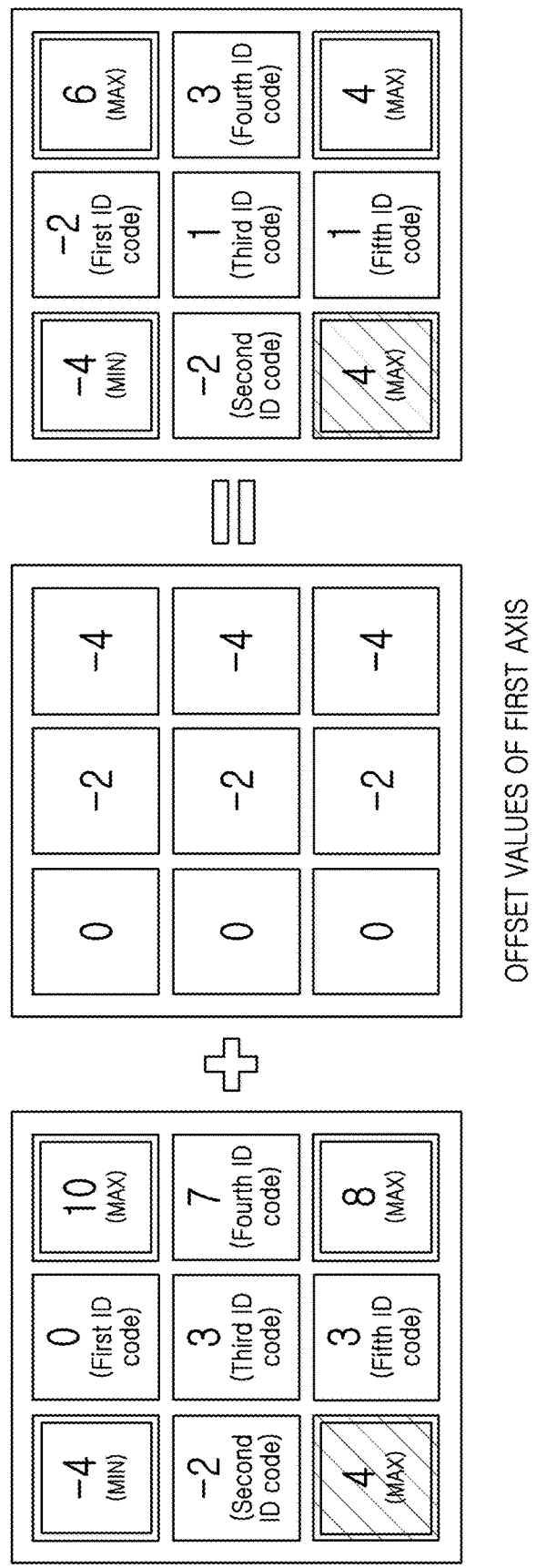
Figure 9D:
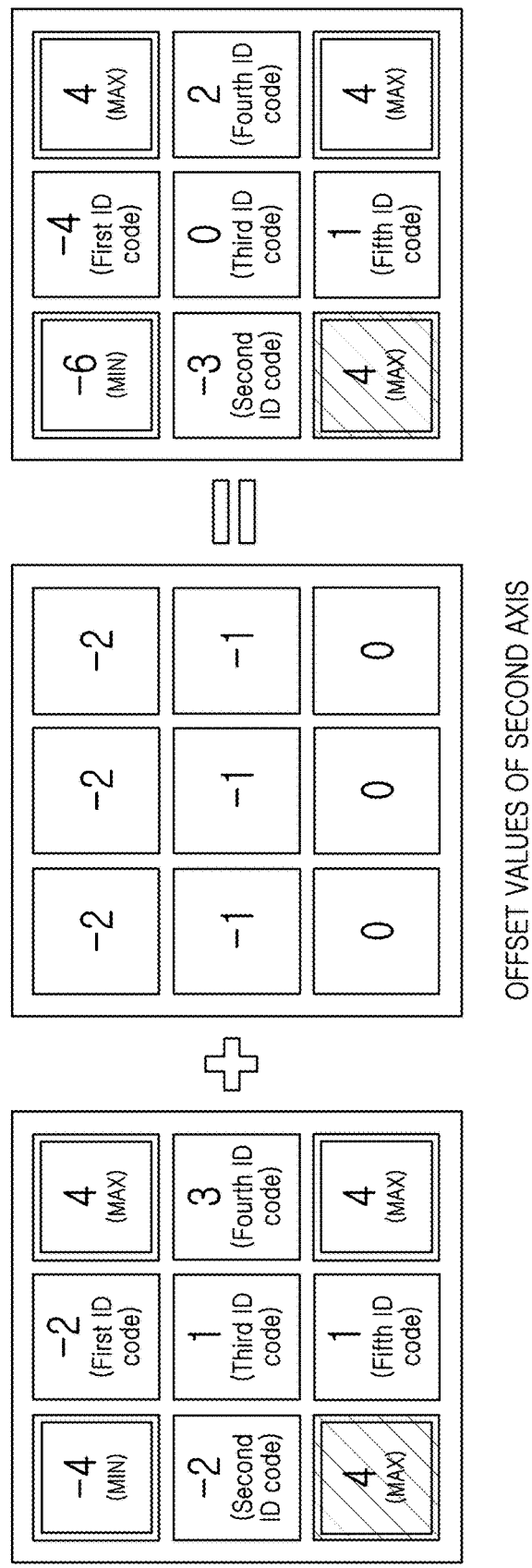
Figure 9E:
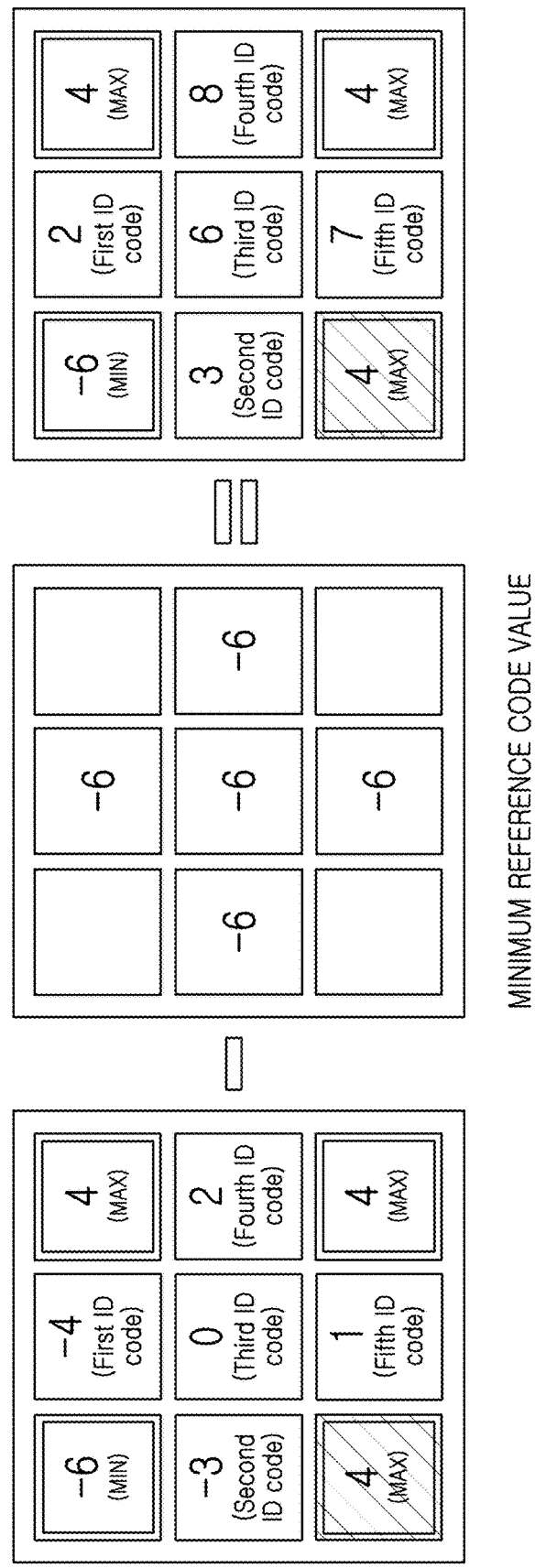
Figure 9F:
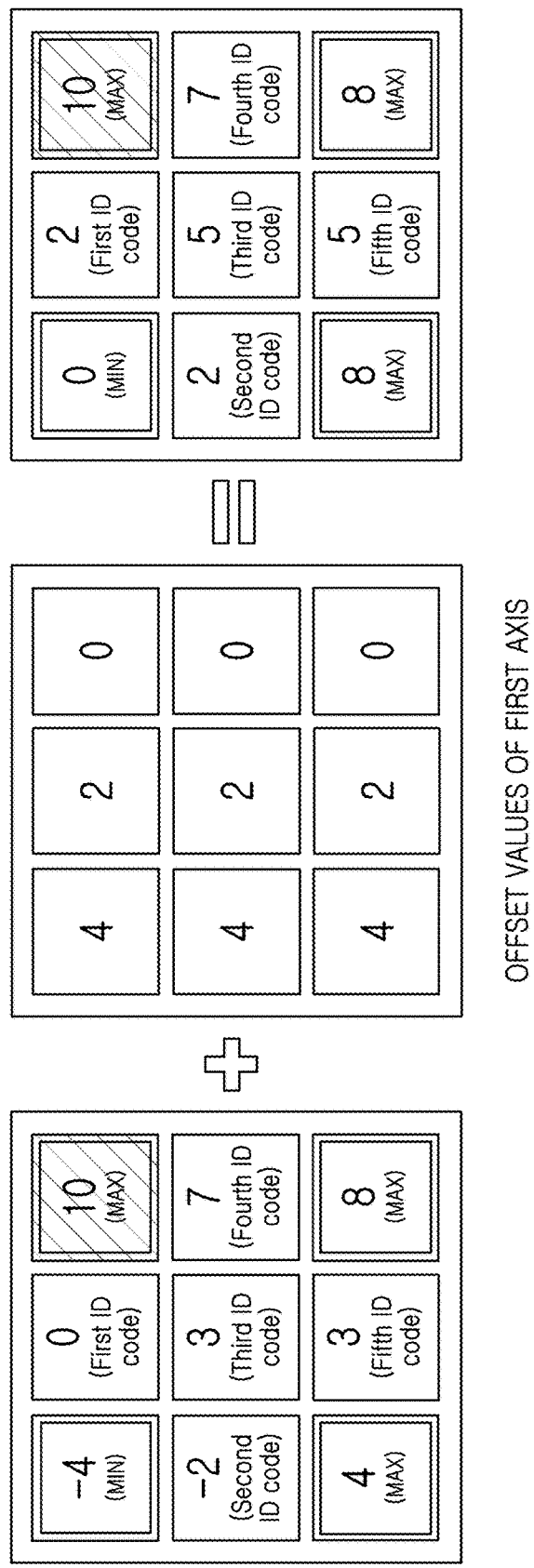
Figure 9G:
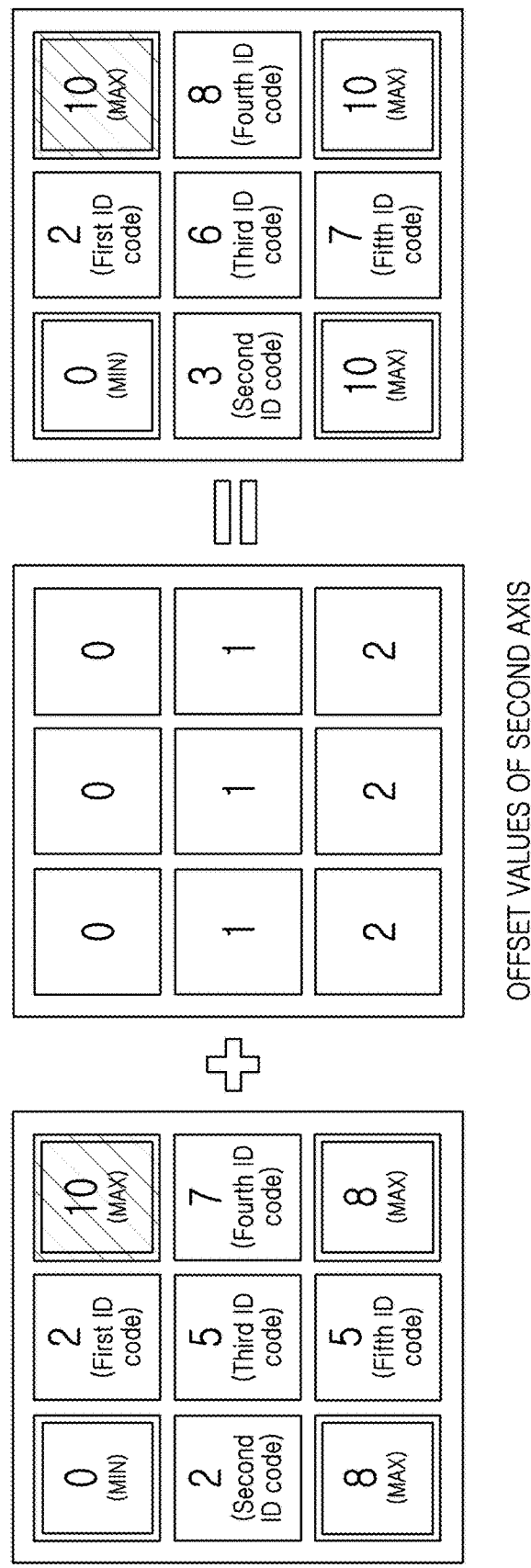
Figure 9H:
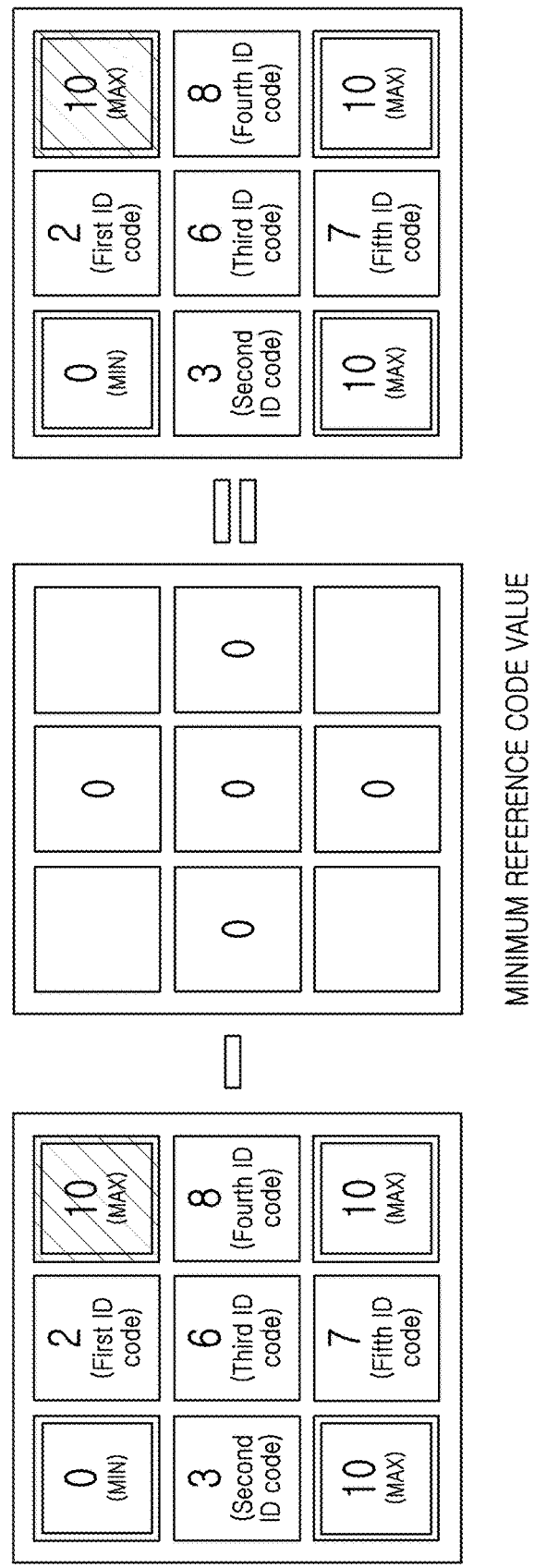

If the restored ID codes are identical to the ID codes which are previously stored, the electronic device 100 performs a function corresponding to the corresponding ID codes in step 339. For example, as illustrated in FIG. 9A, when a first object is sensed within a threshold distance of the touch screen 130, the electronic device 100 may generate, as illustrated in FIG. 9B, a code set including a plurality of code values based on permittivity and a distance of a conductive substance of the first object. In one embodiment, a difference value between a maximum reference code value and a minimum reference code value may be preset to be 10. The electronic device 100 verifies that all of three maximum reference code values are not identical as a result of analyzing the generated code set and calculates offset values of the first axis and offset values of the second axis based on one maximum reference code value. If the offset values of the first axis are calculated based on a maximum reference code value which is located at a left lower side, an offset value of a first column is 0, an offset value of a second column is −2, and an offset value of a third column is −4. The electronic device 100 adds, as illustrated in FIG. 9C, the calculated offset values of the first axis to each of the code values. If the offset values of the second axis are calculated based on a maximum reference code value which is located at a left lower side, an offset value of a first row is −2, an offset value of a second row is −1, and an offset value of a third row is 0. The electronic device 100 may restore the ID code values by, as illustrated in FIG. 9D, adding the offset values of the second axis to a code set corrected based on the offset values of the first axis and, as illustrated in FIG. 9E, subtracting a minimum reference code value "−6" from each of the ID codes. Thus, because the restored ID code values 2, 3, 6, 8, and 7 are identical to ID codes which are previously stored, the electronic device 100 may perform a function corresponding to the corresponding code values. If offset values are calculated based on a maximum reference code value which is located at a right upper side, an offset value of a first column is 4, an offset value of a second column is 2, and an offset value of a third column is 0. The electronic device 100 adds, as illustrated in FIG. 9F, the calculated offset values of the first axis to each of the code values. If offset values of the second axis are calculated based on a maximum reference code value which is located at a right upper side, an offset value of a first row is 0, an offset value of a second row is 1, and an offset value of a third row is 2. The electronic device 100 adds, as illustrated in FIG. 9G, the offset values of the second axis to the code set corrected based on the offset values of the first axis. As illustrated in FIG. 9H, the electronic device 100 may then restore the ID code values by subtracting a minimum reference code value "0" from each of the ID codes. Thus, because the restored ID code values 2, 3, 6, 8, and 7 are identical to ID codes which are previously stored, the electronic device 100 may perform a function corresponding to the corresponding code values.

On the other hand, when the restored ID codes are not identical to the ID codes which are previously stored, the electronic device 100 ends the procedure.

Figure 10A:
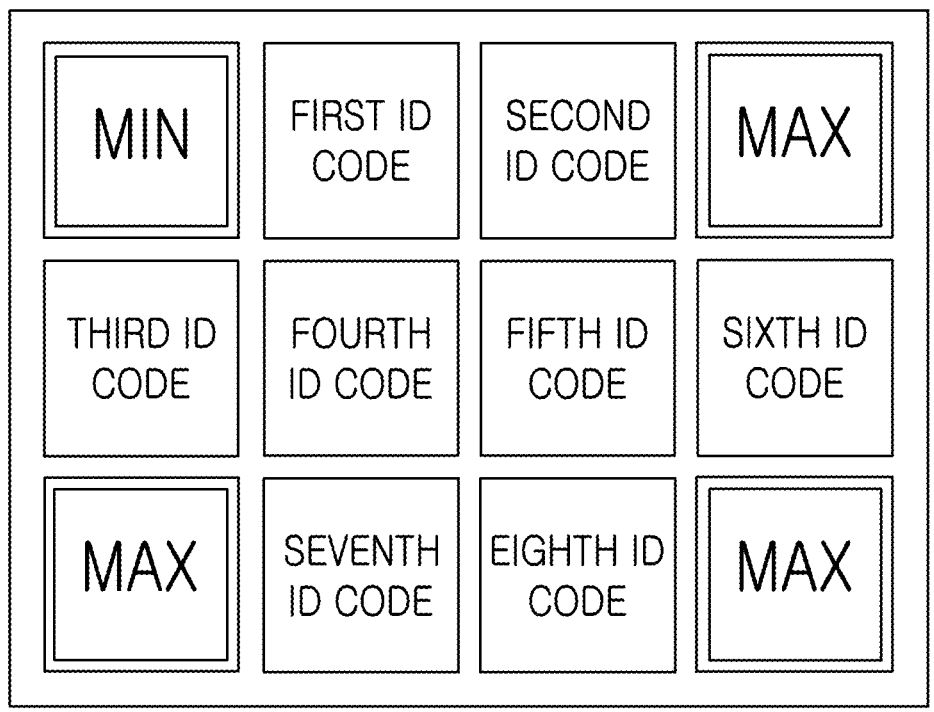
FIGS. 10A and 10B illustrate configuration of a code set generated as a type which is not a square in an electronic device according to an embodiment of the present invention.
Figure 10B:
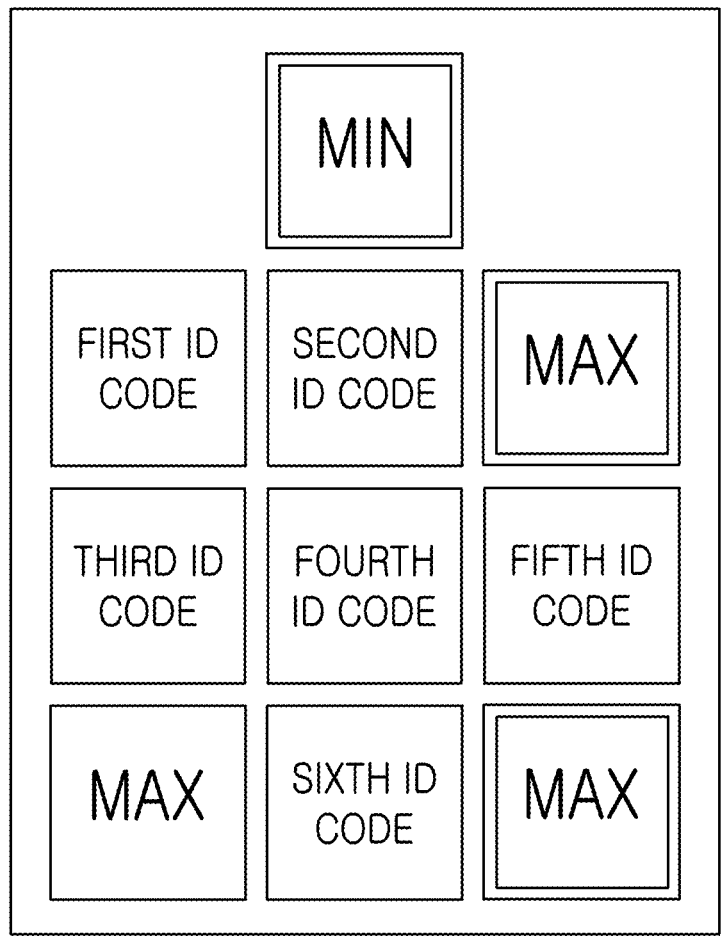

In accordance with an embodiment of the present invention, the code set may be applied, but is not limited to, in a polygon and other closed curve type. For example, as illustrated in FIG. 10A, the code set may be applied in a rectangular type. For another example, as illustrated in FIG. 10B, the code set may be applied in an irregular type.

Figure 11A:
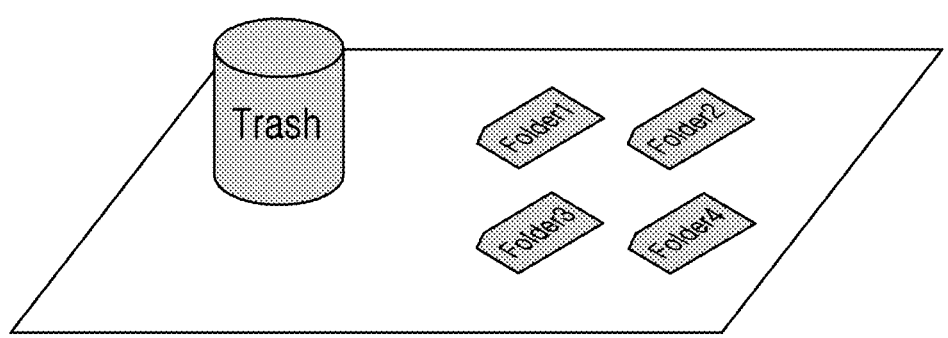
FIGS. 11A through 11C illustrate a process of performing a function of an electronic device based on object information identified in the electronic device according to an embodiment of the present invention.
Figure 11B:
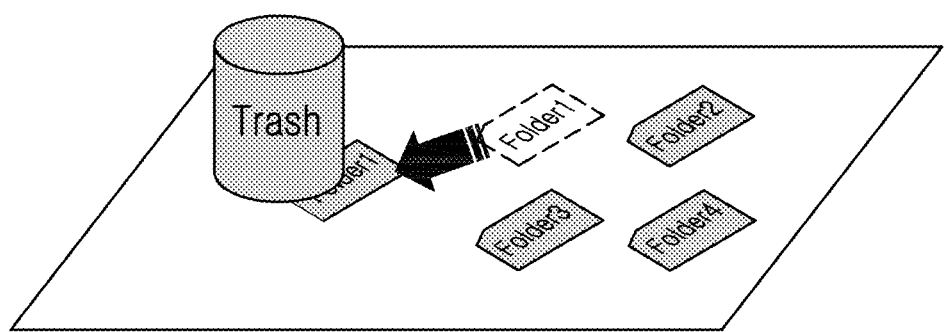
Figure 11C:
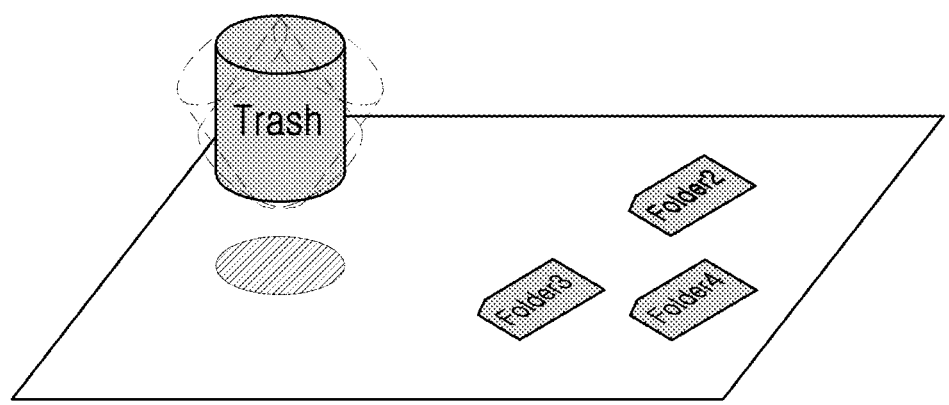

FIGS. 11A through 11C illustrate a process of performing a function of an electronic device based on object information identified in the electronic device according to an embodiment of the present invention.

Referring to FIGS. 1A and 11A to 11C, the electronic device 100 identifies an object having a trash can shape and performs a function corresponding to the corresponding object.

The electronic device 100 may sense, as illustrated in FIG. 11A, the object having the trash can shape which approaches the touch screen within a threshold distance of the touch screen 130 when first through fourth folders are displayed on the touch screen 130. In one embodiment, it is assumed that the object having the trash can shape can be identified by the electronic device 100.

In one embodiment, as illustrated in FIG. 11B, electronic device 100 can drag and move the first folder to a coordinate where the object having the trash can shape is located. In one embodiment, the object having the trash can shape may be continuously sensed because the object having the trash can shape is located within the threshold distance of the touch screen 130.

As illustrated in FIG. 11C, after the object having the trash can shape is moved, the electronic device 100 may delete the first folder displayed on the coordinate where the object having the trash can shape is located. Therefore, the electronic device 100 provides a function in which the first folder is deleted by using an input from the object having the trash can shape.

Figure 12A:
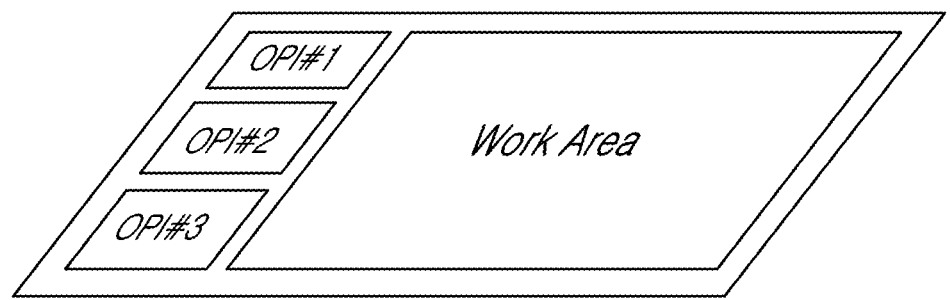
FIGS. 12A through 12C illustrate a process of performing a function of an electronic device based on object information identified in the electronic device according to an embodiment of the present invention.
Figure 12B:
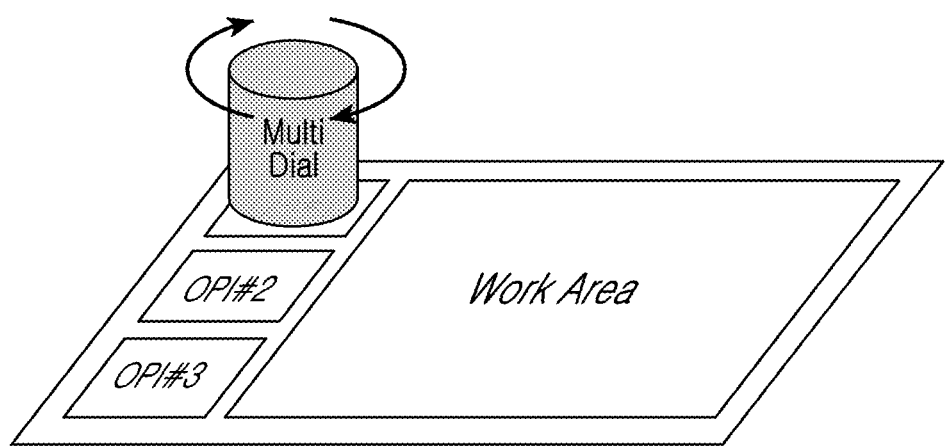
Figure 12C:
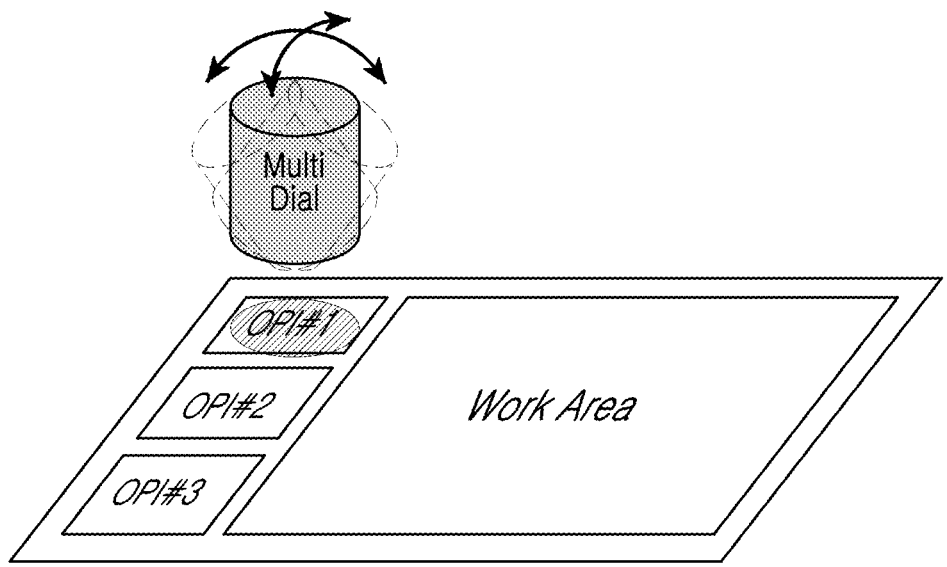

FIGS. 12A through 12C illustrate a process of performing a function of an electronic device based on object information identified in the electronic device according to an embodiment of the present invention.

Referring to FIGS. 1A and 12A to 12C, the electronic device 100 identifies an object and performs a function corresponding to the corresponding object.

The electronic device 100 may sense, as illustrated n in FIG. 12A, the object which approaches the touch screen 130 within a threshold distance of the touch screen 130 when options #1 through #3 with different control functions are displayed on the touch screen 130. In one embodiment, it is assumed that the object which approaches the touch screen 130 within the threshold distance of the touch screen 130 can be identified by the electronic device 100.

As illustrated in FIG. 12B, an approach of the object is sensed above a first option region among first to third option regions displayed on the touch screen 130, and if the object is being rotated, the electronic device 100 may adjust an option value according to a rotating degree of the object. For example, the electronic device 100 may change a font size of a displayed font according to the rotating degree of the object.

Alternatively, as illustrated in FIG. 12C, an approach of the object is sensed above the second option region among the first to third option regions displayed on the touch screen 130, and if the object is being moved, the electronic device 100 may adjust an option value according to the move of the object. For example, the electronic device 100 may change a color of a displayed font according to the operation of the object.

Embodiments of the present invention described in the above specification may be executed by computer software, firmware, or hardware, or the combination of one or more of them, which include procedures or structures disclosed in the above specification and their equivalence. Also, embodiments of the present invention described in the above specification of the present invention may be implemented by one or more computer program products, that is, one or more modules of computer program instructions, which are executed by data processing devices or are encoded on a non-transient computer readable medium for controlling operations of these devices.

The non-transient computer readable medium may be a machine readable storage medium, a machine readable storage board, a memory device, composition of materials which have an influence on a machine readable propagation stream, or the combination of one or more of them. The term "data processing device" includes a programmable processor, a computer, or all devices, apparatuses, and machines, including a multi-processor or a computer, for processing data. The devices may include codes for being added in hardware and generating execution environments for a corresponding computer program, for example, codes configuring processor firmware, a protocol stack, a database management system, an operating system, or the combination of one or more of them.

While the present invention has been particularly shown and described with reference to certain embodiments thereof, it will be understood by those skilled in the art that various changes in form and details may be made therein without departing from the spirit and scope of the present invention as defined by the appended claims.

What is claimed is:

1. A method in an electronic device, the method comprising:
   sensing an object which is located within a threshold distance from a touch screen;
   sensing a plurality of points which are contained in the object;
   generating, by the electronic device, based on at least one of a permittivity of each of the sensed plurality of points and a distance from the touch screen to each of the sensed plurality of points, a code set for identifying the sensed object, wherein the code set varies according to a tilt and a rotating degree of a corresponding object; and
   identifying the sensed object based on the generated code set, wherein identifying the sensed object comprises:
      determining, based on the generated code set, whether the sensed object is horizontal to the touch screen;
      in response to determining that the sensed object is not horizontal to the touch screen, changing the generated code set to a code set corresponding to a horizontal state to the touch screen; and
      identifying, using the changed code set, the sensed object.

2. The method of claim 1, wherein sensing the object which is located within the threshold distance from the touch screen comprises sensing the object which is located within the threshold distance from the touch screen when the object does not come in contact with a touch surface of the touch screen directly based on a hovering method.

3. The method of claim 1, wherein the code set includes at least two maximum reference code values, at least one minimum reference code value, and at least one ID code value.

4. The method of claim 3, wherein identifying the sensed object based on the generated code set comprises:
   verifying whether the at least one ID code value included in the generated code set is identical to at least one ID code value which is previously stored in the electronic device; and
   identifying the sensed object as an object mapped to the ID code value which is previously stored in the electronic device when the ID code value is identical to the ID code value which is previously stored in the electronic device and storing the generated code set as a code set for identifying the sensed object when the ID code value is not identical to the ID code value which is previously stored in the electronic device.

5. The method of claim 3, wherein identifying the sensed object based on the generated code set comprises:
   determining whether the sensed object is horizontal to the touch screen based on the at least two maximum reference code values included in the generated code set;
   subtracting the minimum reference code value from at least the one ID code value included in the generated code set when it is determined that the object is horizontal to the touch screen; and
   identifying the sensed object as an object mapped to an ID code value which is previously stored in the electronic device when the subtracted ID code value is identical to the ID code value which is previously stored in the electronic device.

6. The method of claim 1, wherein determining whether the sensed object is horizontal to the touch screen comprises determining that the sensed object is horizontal to the touch screen when all of maximum reference code values included in the generated code set are identical.

7. The method of claim 5, further comprising:
   determining an axis in which the object is tilted or rotated based on the at least two maximum reference code values included in the generated code set when the object is not horizontal to the touch screen;

calculating offset values of a first axis when the object is tilted or rotated based on the first axis;

adding the corresponding offset value of the first axis to each of code values included in the code set;

subtracting the minimum reference code value from each of the ID code values among code values to which the offset values of the first axis are added; and identifying the sensed object as the object mapped to the ID code values which are previously stored in the electronic device when the subtracted ID code values are identical to the ID code values which are previously stored in the electronic device.

8. The method of claim 7, further comprising:

calculating offset values of the first axis and a second axis when the object is tilted or rotated based on the first axis and the second axis;

adding the corresponding offset value of the first axis to each of code values included in the code set;

adding the offset values of the second axis to code values to which the offset values of the first axis are added;

subtracting the minimum reference code value from each of the ID code values among code values to which the offset values of the second axis are added; and identifying the sensed object as the object mapped to ID code values which are previously stored in the electronic device when the subtracted ID code values are identical to the ID code values which are previously stored in the electronic device.

9. The method of claim 1, wherein the points include a point which is conductive substance.

10. An electronic device comprising:

a processor;

a touch-sensitive display;

a memory; and a program which is stored in the memory and is configured to be executable by the processor, wherein the program includes an instruction for sensing an object which is located within a threshold distance from a touch screen, sensing a plurality of points which are contained in the object, and generating, based on at least one of a permittivity of each of the sensed plurality of points and a distance from the touch screen to each of the sensed plurality of points, a code set for identifying the sensed object and identifying the sensed object based on the generated code set, wherein the code set varies according to a tilt and a rotating degree of a corresponding object, wherein identifying the sensed object comprises:

determining, based on the generated code set, whether the sensed object is horizontal to the touch screen and in response to determining that the sensed object is not horizontal to the touch screen, changing the generated code set corresponding to a horizontal state to the touch screen; and identifying, using the changed code set, the sensed object.

11. The electronic device of claim 10, wherein the program includes an instruction for sensing the object which is located within the threshold distance from the touch screen when the object does not come in contact with a touch surface of the touch screen directly based on a hovering method.

12. The electronic device of claim 10, wherein the code set includes at least two maximum reference code values, at least one minimum reference code value, and at least one ID code value.

13. The electronic device of claim 12, wherein the program includes an instruction for verifying whether the at least one ID code value included in the generated code set is identical to at least one ID code value which is previously stored in the electronic device, identifying the sensed object as an object mapped to the ID code value which is previously stored when the ID code value is identical to the ID code value which is previously stored in the electronic device, and storing the generated code set as a code set for identifying the sensed object when the ID code value is not identical to the ID code value which is previously stored in the electronic device.

14. The electronic device of claim 12, wherein the program includes an instruction for determining whether the sensed object is horizontal to the touch screen based on the at least two maximum reference code values included in the generated code set, subtracting the minimum reference code value from at least the one ID code value included in the generated code set when it is determined that the object is horizontal to the touch screen, and identifying the sensed object as an object mapped to an ID code value which is previously stored in the electronic device when the subtracted ID code value is identical to the ID code value which is previously stored in the electronic device.

15. The electronic device of claim 10, wherein the program includes an instruction for determining that the sensed object is horizontal to the touch screen when all of maximum reference code values included in the generated code set are identical.

16. The electronic device of claim 14, whether the program further includes an instruction for determining an axis in which the object is tilted or rotated based on the at least two maximum reference code values included in the generated code set when the object is not horizontal to the touch screen, calculating offset values of a first axis when the object is tilted or rotated based on the first axis, adding the corresponding offset value of the first axis to each of code values included in the code set, subtracting the minimum reference code value from each of the ID code values among code values to which the offset values of the first axis are added, and identifying the sensed object as the object mapped to the object mapped to the ID code values which are previously stored in the electronic device when the subtracted ID code values are identical to the ID code values which are previously stored in the electronic device.

17. The electronic device of claim 16, wherein the program further includes an instruction for calculating offset values of the first axis and a second axis when the object is tilted or rotated based on the first axis and the second axis, adding the corresponding offset value of the first axis to each of code values included in the code set, adding the offset values of the second axis to code values to which the offset values of the first axis are added, subtracting the minimum reference code value from each of the ID code values among code values to which the offset values of the second axis are added, and identifying the sensed object as the object mapped to ID code values which are previously stored in the electronic device when the subtracted ID code values are identical to the ID code values which are previously stored in the electronic device.

18. The electronic device of claim 10, wherein the points include a point which is conductive substance.

\* \* \* \* \*